United States Patent [19]

Okazaki

[11] Patent Number: 5,718,838
[45] Date of Patent: Feb. 17, 1998

[54] OPTICAL COMPENSATORY SHEET, PROCESS FOR THE PREPARATION OF THE SAME AND LIQUID CRYSTAL DISPLAY

[75] Inventor: Masaki Okazaki, Kanagawa, Japan

[73] Assignee: Fuji Photo Film Co., Ltd., Minami-ashigara, Japan

[21] Appl. No.: 693,631

[22] Filed: Aug. 9, 1996

[30] Foreign Application Priority Data

Aug. 10, 1995 [JP] Japan .................... 7-224515

[51] Int. Cl.$^6$ .................... C09K 19/52; C09K 19/32; C09K 19/00; G03F 1/133
[52] U.S. Cl. .................... 252/299.01; 252/299.62; 349/73; 428/1.2
[58] Field of Search .................... 252/299.62, 299.01; 428/1.2; 349/73

[56] References Cited

U.S. PATENT DOCUMENTS

| | | | |
|---|---|---|---|
| 5,518,783 | 5/1996 | Kawata et al. | 428/1 |
| 5,528,400 | 6/1996 | Arakawa | 359/73 |
| 5,559,618 | 9/1996 | Mori | 359/73 |
| 5,568,290 | 10/1996 | Nakawara | 359/63 |
| 5,583,679 | 12/1996 | Ito et al. | 349/118 |
| 5,635,105 | 6/1997 | Kawata et al. | 252/299.01 |

*Primary Examiner*—C. H. Kelly
*Attorney, Agent, or Firm*—Burns, Doane, Swecker & Mathis, LLP

[57] ABSTRACT

An optical compensatory sheet is basically composed of a transparent support and an optically anisotropic layer provided thereon. The optically anisotropic layer is a layer of polymer having discotic units formed by copolymerization of a compound having at least two functional groups such as isocyanato, isothiocyanato or oxiranyl and a compound having at least two nucleophilic groups, at least one of the compounds being a discotic compound; or polymerization of a discotic compound having at least one functional group and at least one nucleophilic group. A process for the preparation of the optical compensatory sheet, a liquid crystal display and a color liquid crystal display having the optical compensatory sheet are also disclosed.

8 Claims, 4 Drawing Sheets

OPTICAL COMPENSATORY SHEET, PROCESS FOR THE PREPARATION OF THE SAME AND LIQUID CRYSTAL DISPLAY

BACKGROUND OF THE INVENTION

1. Field of the Invention

The present invention relates to an optical compensatory sheet which is useful for preparing a liquid crystal display, a process for the preparation of the sheet, a liquid crystal display provided with the sheet and a color liquid crystal display provided with the sheet.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its thin thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to display characteristics of CRT.

In order to improve the viewing angle characteristics (i.e. to enlarge the viewable angle), arrangement of a phase difference film (optical compensatory sheet) between a pair of polarizing plates and TN liquid crystal cell has been proposed by Japanese Patent Provisional Publications No. 4(1992)-229828 and No. 4(1992)-258923.

The optical compensatory sheets proposed in these Publications show no optical effect when a liquid crystal display is seen from the direction vertical to a screen of the display because phase difference in the direction perpendicular to a surface of the liquid crystal display is almost zero. However, the optical compensatory sheet serves for compensation of phase difference (depending upon wavelengths of light) that occurs when the liquid crystal display is viewed from an oblique direction. The phase difference results in unfavorable viewing angle characteristics such as coloring and disappearance of displayed image.

It is known that the optical compensatory sheet is needed to have negative birefringenece for compensating positive birefringence of twisted nematic liquid crystal and an inclined optic axis.

Japanese Patent Provisional Publications No. 4(1992)-113301, No. 5(1993)-80323 and No. 5(1993)-157913 disclose an optical compensatory sheet having the negative birefringence and inclined optic axis. In more detail, the disclosed sheet is made of polymer having a polymer chain whose optic axis or an optical elastic axis is inclined from a surface of a liquid crystal cell, and is prepared by slicing obliquely a uniaxial polycarbonate film. Therefore an optical compensatory sheet of a large area cannot be easily prepared according to the disclosed process.

It is also known that an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound showing liquid crystal property and positive birefringence. The birefringence plate is prepared by coating a solution of the compound on the support and curing the compound under heating. However, the cured layer dose not show negative birefringence. Hence, the resulting compensatory sheet scarcely enlarges the viewing angle from all directions.

Thus, the above known optical compensatory sheets comprising a support film, an orientation layer of the polymer and a liquid crystalline compound layer, however, cannot greatly enlarge the viewing angle from all directions.

EP 646829 A1 discloses an optical compensatory sheet greatly enlarging the viewing angle from all directions. The optical compensatory sheet has a representative structure comprising a transparent support, an orientation layer thereon, and an optically anisotropic layer of discotic liquid crystalline compound provided on the orientation layer.

In the sheet of EP 646829 A1, use of the discotic liquid crystalline compound brings about enlargement of the viewing angle. The optically anisotropic layer is a layer of discotic liquid crystalline compound or formed by radical polymerization of discotic liquid crystalline compound having a polymerizable group by means of UV light.

According to the present inventor, the above radical polymerization generally needs a photopolymerization initiator and sensitizer, and the initiator or sensitizer occasionally gives variation of phase transition temperature of the discotic compound. Further, the sensitizer occasionally gives change of wavelength of transmitted light. Moreover, the discotic liquid crystalline compound having a polymerizable group employed in photopolymerization is apt to polymerize during reaction for its synthesis or during its storage, and therefore the compound shows poor handling.

Further, polymer formed by radical polymerization has restricted physical and chemical properties because the discotic compound employed in the radical polymerization is needed to have a polymerizable group.

Copending U.S. patent application Ser. No. 08/440,250 describes an optical compensatory sheet having an optically anisotropic layer which comprises a polymer having a discotic structure unit formed of discotic compounds having polymerizable group. As examples of the polymerizable groups, various functional groups such as an isocyanato group, an isothiocyanato group, a carboxyl group, a hydroxyl group and a mercapto group are described, and as an example of the resultant polymer polyester is described. The polyester is considered to be obtained by polymerization between a compound having carboxyl group and one having a hydroxyl group.

SUMMARY IN THE INVENTION

It is an object of the present invention to provide an optical compensatory sheet which has an enlarged viewing angle and can be easily prepared.

It is another object of the present invention to provide an optical compensatory sheet which has an enlarged viewing angle and is capable of having desired properties.

It is a further object of the invention to provide an optical compensatory sheet which has negative birefringence and inclined optic axis and can be easily prepared.

It is a further object of the invention to provide a liquid crystal display provided with a optical compensatory sheet which has an enlarged viewing angle.

It is a further object of the invention to provide a color liquid crystal display provided with a optical compensatory sheet which has an enlarged viewing angle.

There is provided by the invention an optical compensatory sheet which comprises a transparent support and an optically anisotropic layer provided thereon, wherein the optically anisotropic layer is a layer of polymer having discotic structure units formed by polymerization of a compound having at least two functional groups and a compound having at least two nucleophilic groups, at least one of the compounds being a discotic compound, or by polymerization of a discotic compound having at least one functional group and at least one nucleophilic group, the functional group being one selected from the group consisting of an isocyanato group, an isothiocyanato group, an oxiranyl group, an azyridinyl group, a thiiranyl group, an acid anhydride group and an activated ester group.

Preferred embodiments of the optical compensatory sheet of the invention are as follows:

1) The optical compensatory sheet wherein the nucleophilic group is at least one selected from the group consisting of an amino group, a hydroxyl group, a mercapto group, a carboxyl group, an oxide anion group, a sulfide anion and a carboxylato anion group.

2) The optical compensatory sheet wherein the transparent support has an orientation layer thereon (i.e., an orientation layer is provided between the transparent support and the optically anisotropic layer).

3) The optical compensatory sheet wherein the discotic compound has liquid crystalline property.

4) The optical compensatory sheet wherein the compound having at least two functional groups has the same functional groups and the compound having at least two nucleophilic groups has the same nucleophilic groups.

5) The optical compensatory sheet wherein the heating for formation of discotic nematic phase is conducted in such a manner that one side of a layer to be converted into the optically anisotropic layer on the transparent support is in contact with a gas.

The optical compensatory sheet can be advantageously obtained by the process comprising the steps of:

coating a coating liquid containing a compound having at least two functional groups and a compound having at least two nucleophilic groups, at least one of the compounds being a discotic compound, or a coating liquid containing a compound having at least one functional group and at least one nucleophilic group, on the transparent support to form a coated layer, the functional group being one selected from the group consisting of an isocyanato group, an isothiocyanato group, an oxiranyl group, an azyridinyl group, a thiiranyl group, an acid anhydride group and an activated ester group;

heating the coated layer to form discotic liquid crystalline phase;

heating the layer of discotic liquid crystalline phase to cause reaction between the functional group and the nucleophilic group contained in the layer, whereby a cured layer (a polymer layer) is formed; and cooling the cured layer to form an optically anisotropic layer.

Further, there is provided by the invention a liquid crystal display comprising a liquid crystal cell which comprises a pair of substrates each of which is provided with a transparent electrode and twisted nematic liquid crystal sealed therebetween, a polarizing sheet arranged on each side of the liquid crystal cell, and the above-mentioned optical compensatory sheet provided between at least one side of the liquid crystal cell and the polarizing sheet Further, there is provided by the invention a color liquid crystal display comprising a liquid crystal cell which comprises a pair of substrates provided with a transparent electrode, a transparent electrode of picture element and color filter, and twist-oriented nematic liquid crystal sealed between the substrates, a polarizing sheet arranged on each side of the liquid crystal cell, and the above-mentioned optical compensatory sheet provided between at least one side of the liquid crystal cell and the polarizing sheet.

The optical compensatory sheet of the invention has a structure that an optically anisotropic layer comprising polymer having discotic structure units is formed on a transparent support. The layer is formed by polymerization of a compound having at least two functional groups such as isocyanato or oxiranyl groups with a compound having at least two nucleophilic groups, at least one of the compounds being a discotic compound. Otherwise, the layer is formed by polymerization of a compound having the functional group and nucleophilic group.

The optical compensatory sheet has a negative birefringence and the minimum absolute retardation value (including optic axis) in a direction inclined from the normal of the sheet. Therefore in the case of providing a liquid crystal cell with the sheet, capable of greatly enlarging viewing angle. Further, the sheet shows excellent heat resistance and good durability in environment of high temperature because the layer is formed of a polymer having discotic structure.

The polymer layer is formed through polymerization (including copolymerization) such as polycondensation or polyaddition, and therefore the polymerization needs no photopolymerization initiator and sensitizer used in radical polymerization by light. Thus, in the polymer layer, it is not needed to regard influence (variation of transition temperature) produced by incorporating the initiator or sensitizer into the optically anisotropic layer. Moreover, the discotic compound employed in the invention having functional group or nucleophilic group is scarcely polymerize during reaction for its synthesis or during its storage, and therefore the compound shows good handling compared with the compounds employed in photopolymerization. Hence, the optically anisotropic layer can be easily formed compared with one formed through photopolymerization.

Thus, the optical compensatory sheet of the invention has excellent viewing characteristics, satisfactory heat-resistance and durability at high temperatures.

The liquid crystal display of the invention is provided with an optical compensatory sheet is improved in viewing characteristics such as coloring of a displayed image and reversing of black-and-white image when the viewing direction to the liquid crystal display is greatly inclined from the normal to a surface of the screen.

DETAILED DESCRIPTION OF THE INVENTION

Figure 1:
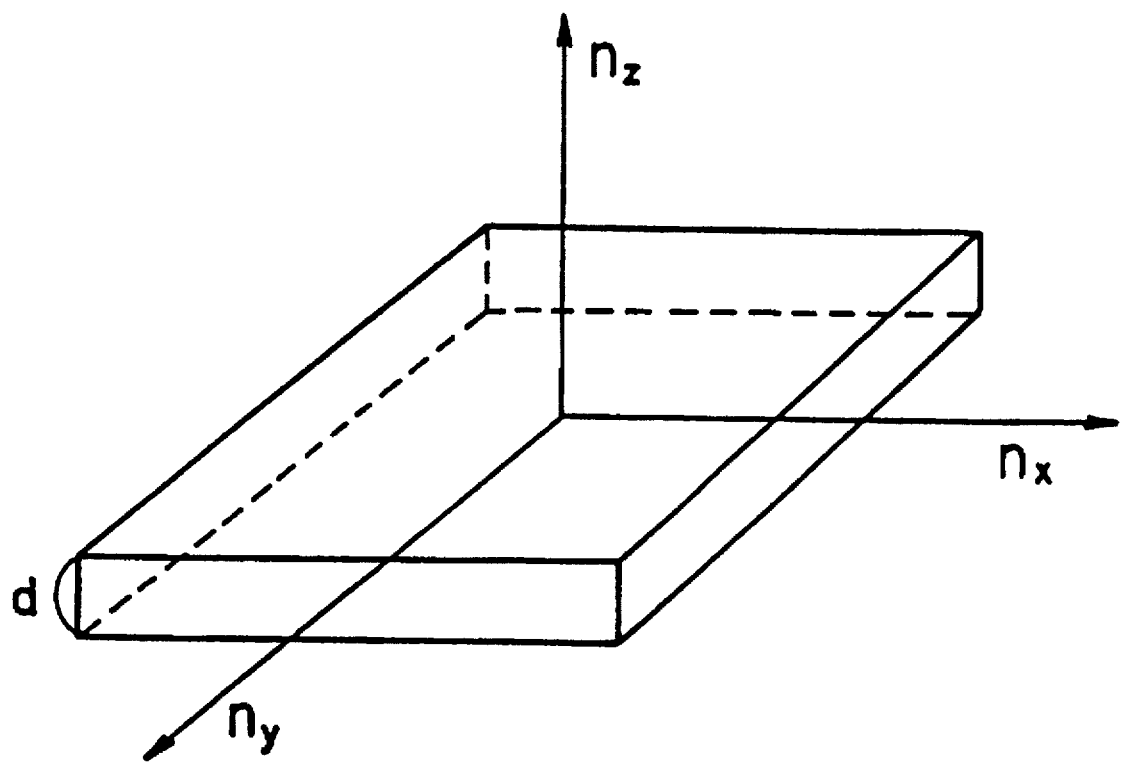
FIG. 1 is a view schematically showing the refractive indices of the three axes of the transparent film of the invention.

The optical compensatory sheet of the invention has a basic structure comprising a transparent support and the optically anisotropic layer provided thereon. An orientation layer is generally provided between the transparent support and the optically anisotropic layer. The optically anisotropic layer of the invention is a layer of polymer having discotic structure units which is formed by various polymerization other than radical polymerization.

The optical compensatory sheet is, for example, formed by coating a coating liquid containing a compound having functional groups (e.g., isocyanato, isothiocyanato, oxiranyl) and a compound having nucleophilic groups (e.g., hydroxyl, amino, carboxyl) on the transparent to form a coated layer, heating the coated layer to form discotic nematic phase; and heating these compounds to polymerize them, whereby a cured layer is obtained; and cooling the layer to form an optically anisotropic layer (e.g., polyether layer, polyurethane layer, polyester layer, polyamide layer). At least one of the two compounds is a discotic compound (preferably has liquid crystalline property). The compound or discotic compound may be employed in two or more kinds. Further, instead of the two compounds, a discotic compound having both the functional group and nucleophilic group can be employed.

As described above, the optically anisotropic layer of the invention generally is a layer of polymer having oriented discotic structure units and is formed by various polymerization (e.g., condensation polymerization, polyaddition, ring-opening polymerization) other than radical polymerization. In the optically anisotropic layer, a layer having desired properties (e.g., optical, physical and chemical properties) can be easily formulated because compounds for forming the optically anisotropic layer can be selected from a great variety of compounds. Naturally, the kind of the main bonding constituting a polymer can be optionally selected and therefore a polymer having desired characteristics can be easily obtained.

Moreover, since the optically anisotropic layer can be formed with using no photopolymerization initiator and sensitizer used in photopolymerization (UV), it is not needed to regard influence (variation of transition temperature) produced by incorporating the initiator into the optically anisotropic layer.

Compounds employable for formation of the optically anisotropic layer include discotic compounds such as a discotic compound having functional groups (e.g., isocyanato, isothiocyanato or oxiranyl), a discotic compound having nucleophilic groups and a discotic compound having both the functional and nucleophilic groups; and compounds having no discotic unit (non-discotic compounds) such as a compound having the functional groups, a compound having nucleophilic groups and compounds having both the functional and nucleophilic groups.

The discotic compounds are first explained below.

The discotic compounds are classified into compounds having liquid crystalline property and compounds having no liquid crystalline property. The discotic compounds having liquid crystalline property (i.e., having discotic liquid crystalline phase) are preferred.

The discotic liquid crystalline phases are roughly divided into a columnar phase wherein discotic units of discotic molecules are superposed in the form of column by intermolecular force, a discotic nematic phase wherein discotic molecules are aggregated in a random fashion, and a chiral discotic nematic phase wherein discotic molecules are arranged in helical structure. Although the columnar phase is often found during study of the discotic liquid crystalline compound, the discotic nematic phase is seldom found, as described in Physical properties of Liquid Crystalline Materials (W. H. de Jew, by Gordon and BReach, Science Publishers, 1980).

The discotic liquid crystalline compound is characterized in that a discotic structure is located at a center of the compound as a parent core and further straight chain groups such as alkyl, alkoxy and benzoyl having a substituent are radially bonded to the discotic structure. The feature of the parent core other than the straight chain groups (i.e., discotic compound having no substituent) can be given in the following manner.

The molecular size of the parent core is determined as follows:

1) A planner molecular structure suitable for the molecule (parent core) is designed by determining the bond distances and the bond angles (in which the standard values according to hybridization of the orbitals are generally employed) referring to, for example, "A Handbook of Chemistry, fourth edition, basic series, II volume, 15 chapter, edited by The Chemical Society of Japan, 1993".

2) The resultant planner molecular structure is appropriately modified by utilizing a method of molecular orbital method and a method of molecular mechanics (which are described in Gaussian 92, MOPAC 93, CHARAm/QUANTA and NM3, preferably Gaussian 92), to give an optimum structure.

3) To each of atoms constituting the molecule having the optimum structure, sphere defined by van der Waals radius is given, to picture the molecular structure.

4) A minimum rectangular parallelepiped into which the molecular structure obtained in above 3) can be incorporated is determined. The rectangular parallelepiped has three edges a, b and c.

The above procedures 3) and 4) are preferably conducted in the following manner.

3') The center of gravity of molecule having the optimum structure is placed on the origin of coordinate axes including a main axis of inertia (main axis of inertia ellipse body).

4') To each of atoms constituting the molecule having the optimum structure, sphere defined by van der Waals radius is given, to picture the molecular structure.

5) On the surfaces of the spheres defined by van der Waals radius, length in the each direction of the coordinate axes is measured. The three lengths represent a, b and c.

The molecular structure of the parent core of the discotic liquid crystalline compound can be represented, by using the above a, b and c, as a structure satisfying the conditions of $a \geq b > c$ and $a \geq b \geq a/2$, preferably the conditions of $a \geq b > c$ and $a \geq b \geq 0.7a$. Further, the structure preferably satisfies the condition of $b/2 > c$.

Examples of the discotic liquid crystalline compounds employed in the invention include benzene derivatives, triphenylene derivatives, truxene derivatives, phthalocyanine derivatives, porphyrin derivatives, anthracene derivatives, azacrown derivatives, cyclohexane derivatives, β-diketone metal complex derivatives, hexaethynylbenzene derivatives, dibenzopyrene derivatives, coronene derivatives, macrocyclic compounds of phenylacetylene-type, which are described in Elements of Chemistry, vol. 22, Chemistry of Liquid Crystal, edited by The Chemical Society of Japan, 1994; C. Destrade et al., Mol. Cryst. vol. 71, pp. 111, 1981; B. Kohn et al., Angew. Chem. vol. 96, pp. 70, 1984; J. M. Lehn et al., J. Chem. Commun. pp. 1794, 1985; and J. Zhang et al., J. Am. Chem. Soc. vol. 116, pp.2655, 1994. Further, cyclic compounds and those substituted with hetero atom described in "New Aromatic Chemistry, Elements of Chemistry, vol. 15, edited by The Chemical Society of Japan, 1977", can be mentioned as the examples. Furthermore, the examples include discotic molecule that a plural molecules form an aggregate by hydrogen bond or coordinate bond in the same manner as the above metal complex.

The discotic liquid crystalline compound generally has a structure that a basic structure of the above compound is located at a center of the crystal as a parent core and further straight chain groups such as alkyl, alkoxy and benzoyl having a substituent are radially bonded to the compound. The discotic liquid crystal compounds usually have a negative birefringence (negative uniaxial property) and orientation property. The discotic liquid crystalline compounds preferably has discotic nematic phase ($N_D$). Preferred examples of the discotic liquid crystalline compounds are triphenylene derivatives and truxene derivatives. The side chain preferably is an alkyl group, an alkoxy group, an alkylthio group, an acyloxy group, an alkoxycarbonyl group or a halogen atom, and especially an alkyl group, an alkoxy group, an alkylthio group or an acyloxy group. The groups are described in "Chemical Review, C. Hansch, A. Leo, R. W. Taft, vol. 91, pp. 161–195, 1991, American chemical Society". Further, these groups may have an aryl group, a heterocyclic group, an ether group, an ester group, a carbonyl group, a thioether group, a sulfoxide group, a sulfonyl group or an amide group.

Examples of the side chains bonded to the parent core (i.e., center discotic structure portion of discotic molecule) include alkanoyloxy groups (e.g., hexanoyloxy, heptanoyloxy, octanoyloxy, nonanoyloxy, decanoyloxy and undecanoyloxy), alkylsulfonyl groups (e.g., hexylsulfonyl, heptylsulfonyl, octylsulfonyl, nonylsulfonyl, decylsulfonyl and undecylsulfonyl), alkylthio groups (e.g., hexylthio, heptylthio and dodecylthio), alkoxy groups (e.g., butoxy, pentyloxy, hexyloxy, heptyloxy, octyloxy, nonyloxy, decyloxy or undecyloxy), 2-(4-alkylphenyl)ethynyl groups (examples of the alkyl: methyl, ethyl, propyl, butyl, pentyl, hexyl, heptyl, octyl and nonyl), alkoxy groups having terminal vinyl (e.g., 4-vinylbutoxy, 5-vinylpentyloxy, 6-vinylhexyloxy, 7-vinylheptyloxy, 8-vinyloctyloxy or 9-vinylnonyloxy), 4-alkoxyphenyl groups (examples of the alkoxy: butoxy, pentyloxy, hexyloxy, heptyloxy, octyloxy, nonyloxy, decyloxy or undecyloxy), alkoxymethyl groups (examples of the alkoxy: butoxy, pentyloxy, hexyloxy, heptyloxy, octyloxy, nonyloxy, decyloxy or undecyloxy), alkylthiomethyl groups (examples of the alkylthio: hexylthio, heptylthio and dodecylthio), 2-alkylthiomethyl groups (examples of the alkylthio: hexylthio, heptylthio and dodecylthio), 2-alkylthioethoxymethyl groups (examples of the alkylthio: hexylthio, heptylthio and dodecylthio), 2-alkoxycarbonylethyl groups (examples of the alkoxy: butoxy, pentyloxy, hexyloxy, heptyloxy, octyloxy, nonyloxy, decyloxy or undecyloxy), a cholesteryloxycarbonyl group, a β-sitosteryloxycarbonyl group, 4-alkoxyphenoxycarbonyl groups (examples of the alkoxy: butoxy, pentyloxy, hexyloxy, heptyloxy, octyloxy, nonyloxy, decyloxy or undecyloxy), 4-alkoxybenzoyloxy (examples of the alkoxy: butoxy, pentyloxy, hexyloxy, heptyloxy, octyloxy, nonyloxy, decyloxy or undecyloxy), 4-alkylbenzoyloxy groups (examples of the alkyl: methyl, ethyl, propyl, butyl, pentyl, hexyl, heptyl, octyl and nonyl), and 4-alkoxybenzoyl groups (examples of the alkoxy: butoxy, pentyloxy, hexyloxy, heptyloxy, octyloxy, nonyloxy, decyloxy or undecyloxy).

In the examples of side chains, the phenly group may be replaced with one of other aryl groups such as naphthyl, phenanthryl and anthryl may be in place of the phenyl group. The phenyl group may further have a substituent. Furthermore, the phenyl may be replaced with a heterocyclic group such as pyridyl, pyrimidyl, triazinyl, thienyl, furyl, pyrrolyl, pyrazolyl, imidazolyl, triazolyl, thiazolyl, imidazolinyl, oxazolyl, thiadiazolyl, oxadiazolyl, quinolyl, or isoquinolyl.

The discotic compound or discotic liquid crystalline compound has a structure that one or more side chains are combined to the above core (discotic structure unit). The kind and number of side chain and the kind of core can be appropriately combined to form a discotic compound.

The functional groups (i.e., isocyanato, isothiocyanato, oxiranyl, azyridinyl, thiiranyl, acid anhydride group and activated ester group) and the nucleophilic groups are generally replaced with a hydrogen atom of the side chain, and preferably combined to the side chain at the terminal position. The discotic compound or non-discotic compound have one or more functional groups or nucleophilic groups; or both one or more functional groups and one or more nucleophilic groups. The molar amount of the functional group and that of the nucleophilic group are almost equal each other in the composition for forming the optically anisotropic layer. The composition may contain discotic compound or non-discotic compound having no functional or nucleophilic group.

The optically anisotropic layer is generally formed of one or more discotic liquid crystalline compounds; or one or more discotic liquid crystalline compounds and at least one of discotic compound and non-discotic compound.

Therefore, the optically anisotropic layer is generally formed of (1) one or more discotic liquid crystalline compounds having functional groups (e.g., isocyanato, isothiocyanato or oxiranyl) and one or more discotic liquid crystalline compounds having nucleophilic groups; (2) one ore more discotic liquid crystalline compounds having functional groups and at least one of discotic compounds having nucleophilic groups and/or at least one of non-discotic compounds having nucleophilic groups; (3) one or more discotic liquid crystalline compounds having nucleophilic groups and at least one of discotic compounds having functional groups and/or at least one of non-discotic compounds having functional groups; (4) one ore more discotic liquid crystalline compounds having functional groups and/or at least one of discotic compounds having functional groups and at least one of non-discotic compounds having nucleophilic groups; (5) one or more discotic liquid crystalline compounds having nucleophilic groups and/or at least one of discotic compounds having nucleophilic groups and at least one of non-discotic compounds having functional groups; (6) one or more discotic liquid crystalline compounds having functional groups and nucleophilic groups.

The discotic compound (including discotic liquid crystalline compound) preferably is a compound having the formula (1) or (2).

(1)

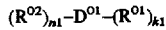

wherein $D^{01}$ represents a discotic structure unit (e.g., a benzene ring, a triphenylene ring, a truxene ring, a phthalocyanine ring, a porphyrin ring, an anthracene ring, an azacrown ring, a cyclohexane ring, a β-diketone metal complex ring, a hexaethynylbenzene ring, a dibenzopyrene ring, a coronene ring, or a macrocyclic ring of phenylacetylenetype), $R^{02}$ represents a group having no reactivity (i.e., having no functional or nucleophilic group), $R^{01}$ represents a group of the formula:

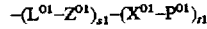

in which $Z^{01}$ represents an aromatic ring, an aromatic ring having a substituent, a heterocyclic ring or a heterocyclic ring having a substituent, $P^{01}$ represents one group selected from the group consisting an isocyanato group, a thiocyanato group, an oxiranyl group, an azyridinyl group, a thiiranyl group, an acid anhydride group and an activated ester group or a nucleophilic group; $L^{01}$ and $X^{01}$ each represent a divalent connective group or a chemical bond, s1 is 0 or 1, and t1 is an integer of 1 to 5; and n1 represents an integer of 0 to 11 and k1 represents an integer of 1 to 12, under the condition of n1+k1≦12.

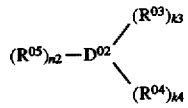 (2)

wherein $D^{02}$ represents a discotic structure unit (e.g., a benzene ring, a triphenylene ring, a truxene ring, a phthalocyanine ring, a porphyrin ring, an anthracene ring, an azacrown ring, a cyclohexane ring, a β-diketone metal complex ring, a hexaethynylbenzene ring, a dibenzopyrene ring, a coronene ring, or a macrocyclic ring of phenylacetylenetype), $R^{05}$ represents a group having no reactivity (i.e., having no functional or nucleophilic group), $R^{03}$ represents a group of the formula:

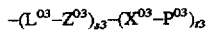

in which $Z^{03}$ represents an aromatic ring, an aromatic ring having a substituent, a heterocyclic ring or a heterocyclic ring having a substituent, $P^{03}$ represents one group selected from the group consisting an isocyanato group, a thiocyanato group, an oxiranyl group, an azyridinyl group, a thiiranyl group, an acid anhydride group and an activated ester group; $L^{03}$ and $X^{03}$ each represent a divalent connective group or a chemical bond, s3 is 0 or 1, and t3 is an integer of 1 to 5;

$R^{04}$ represents a group of the formula:

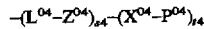

in which $Z^{04}$ represents an aromatic ring, an aromatic ring having a substituent, a heterocyclic ring or a heterocyclic ring having a substituent, $P^{04}$ represents a nucleophilic group; $L^{04}$ and $X^{04}$ each represent a divalent connective group or a chemical bond, s4 is 0 or 1, and t4 is an integer of 1 to 5; and n2 represents an integer of 0 to 11, k3 represents an integer of 1 to 12, k4 represents an integer of 1 to 12 and k3+k4 represents an integer of 2 to 12, under the condition of n2+k3+k4≦12.

$D^{01}$ and $D^{02}$ generally represent a benzene ring, a cyclohexane ring, a triphenylene ring, a truxene ring, a phthalocyanine ring, a azacrown ring or a macrocycle ring of phenylacetylene, and preferably are a ring capable of forming $N_D$ phase (discotic nematic phase). Especially $D^{01}$ and $D^{02}$ are a triphenylene ring or a truxene ring.

$Z^{01}$, $Z^{03}$ and $Z^{04}$ generally represent a divalent group of a benzene ring, a benzene ring having a substituent, a heterocyclic ring (e.g., pyridine, pyrimidine, triazine, thiene, furan, pyrrole, pyrazole, imidazole, triazole, thiazole, imidazoline, oxazole, thiadiazole, oxdiazole, quinoline or isoquinoline) or a heterocyclic ring having a substituent. Preferred are the benzene ring and heterocyclic ring having no substituent.

$L^{01}$, $L^{03}$ and $L^{04}$ each represent a chemical bond or a divalent connecting group such as an alkylene group (e.g., ethylene, propylene, butylene, pentylene, hexylene, heptylene, octylene or nonylene), an alkyleneoxy group (e.g., ethyleneoxy, propyleneoxy, butyleneoxy, pentyleneoxy, hexyleneoxy, heptyleneoxy, octyleneoxy or nonyleneoxy), or an alkylene or alkyleneoxy group having 1 to 25 carbon atoms having —C(O)—, —O—C(O)—, —S(C=S)—, —O—C(O)—O—, —C(O)—O—C(O)—, —C(O)NR°—, —NR°—, —NR°C(O)NR°— (wherein R° represents hydrogen or lower alkyl), —O— or —S— in the course of the alkylene or alkyleneoxy group.

$X^{01}$ represents a divalent group or a chemical bond for connecting $Z^{01}$ with $P^{01}$. $X^{03}$ and $X^{04}$ represent a divalent group or a chemical bond for connecting $Z^{03}$ with $P^{03}$ connecting $Z^{04}$ with $P^{04}$ respectively. Examples of the divalent groups include an alkylene group (e.g., ethylene, propylene, butylene, pentylene, hexylene, heptylene, octylene or nonylene) and an alkyleneoxy group (e.g., ethyleneoxy, propyleneoxy, butyleneoxy, pentyleneoxy, hexyleneoxy, heptyleneoxy, octyleneoxy or nonyleneoxy).

Each of $R^{02}$ and $R^{05}$ generally represents an alkyl group, an alkoxy group, an oligooxyethylene group, an acyl group, an acyloxy group or a benzoyloxy group; or those having a substituent. Preferred are those having no substituent. Adjacent two or more groups of $R^{02}$ or $R^{05}$ may connect each other to form a ring, whereby the discotic compound may have radially one or two side chains having no functional group.

Examples of the nucleophilic groups include groups having lone pair electrons (e.g., groups having a nitrogen atom or atom of nitrogen group (VB group)), groups having a oxygen atom or atom of oxygen group (VIB group)), groups having a fluorine atom or atom of fluorine group (VIIB group)), and groups having anion derived from those groups. Preferred examples of the nucleophilic groups include an amino group, a hydroxyl group, a mercapto group, a carboxyl group, an oxide anion group (group having —O⁻X⁺ (X⁺: e.g., N(CH₃)₄⁺)), a sulfide anion (group having —S⁻X⁺ (X³⁰ : e.g., N(CH₃)₄⁺)), and a carboxylato anion group (group having —COO⁻X⁺ (X⁺: e.g., N(CH₃)₄⁺)).

The discotic compound preferably is a compound having the formula (3), (4), (5) or (6).

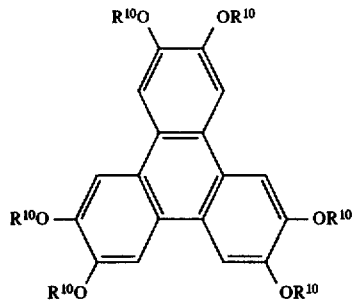
(3)

wherein R¹⁰ is the following group:

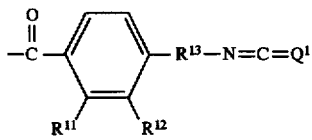

in which each of R¹¹ and R¹² represents independently a hydrogen atom, a halogen atom or a methyl group, and R¹³ represents an alkyleneoxy group or a chemical bond and Q¹ represents an oxygen atom or a sulfur atom.

R¹¹ and R¹² preferably represent a hydrogen atom or a methyl group. R¹³ represents an alkyleneoxy group of 1 to 12 carbon atoms (preferably 1 to 9 carbon atoms). Examples of the alkyleneoxy group include alkyleneoxy groups such as ethyleneoxy, propyleneoxy, butyleneoxy, pentyleneoxy, hexyleneoxy and heptyleneoxy, and alkyleneoxy groups substituted one or more alkyleneoxy such as 2-ethyleneoxyethyleneoxy, methyleneoxypropyleneoxy, methyleneoxybutyleneoxy, methyleneoxydiethyleneoxy and methyleneoxytriethyleneoxy.

Preferred examples of R¹⁰ of the formula (3), are as follows:

| Compound No. | R¹¹ | R¹² | R¹³ | Q¹ |
|---|---|---|---|---|
| TP-1 | H | H | —O—(CH₂)₂— | O |
| TP-2 | H | H | —O—(CH₂)₃— | O |
| TP-3 | H | H | —O—(CH₂)₄— | O |
| TP-4 | H | H | —O—(CH₂)₅— | O |
| TP-5 | H | H | —O—(CH₂)₆— | O |
| TP-6 | H | H | —O—(CH₂)₇— | O |
| TP-7 | H | H | —O—(CH₂)₈— | O |
| TP-8 | H | H | —O—(CH₂)₉— | O |
| TP-9 | H | H | —O—(CH₂)₆— | S |
| TP-10 | H | Cl | —O—(CH₂)₆— | O |
| TP-11 | CH₃ | CH₃ | —O—(CH₂)₂— | S |
| TP-12 | H | CH₃ | —O—(CH₂)₃— | S |
| TP-13 | CH₃ | H | —O—(CH₂)₄— | O |
| TP-14 | CH₃ | H | —O—(CH₂)₅— | O |
| TP-15 | CH₃ | H | —O—(CH₂)₆— | S |
| TP-16 | CH₃ | CH₃ | —O—(CH₂)₆— | O |
| TP-17 | H | CH₃ | —O—(CH₂)₆— | O |
| TP-18 | H | H | —O—(CH₂)₃—OCH₂— | S |
| TP-19 | CH₃ | H | —O—(CH₂)₆— | O |
| TP-20 | H | F | —O—(CH₂)₆— | O |
| TP-21 | H | H | —O—(CH₂)₂— | S |
| TP-22 | H | H | —O—(CH₂)₄—OCH₂— | O |
| TP-23 | H | H | —O—(C₂H₄O)₂—CH₂— | O |
| TP-24 | CH₃ | H | —O—(C₂H₄O)₂—CH₂— | O |
| TP-25 | H | H | —O—(C₂H₄O)₃—CH₂— | O |

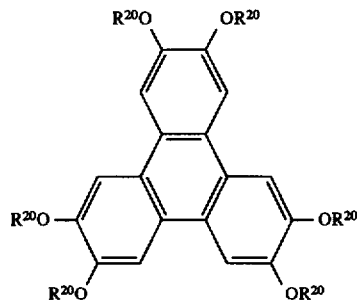
(4)

wherein R²⁰ is the following group:

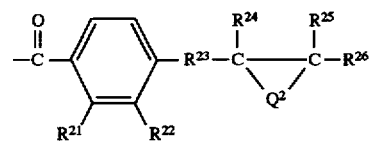

in which each of R²¹ and R²² represents independently a hydrogen atom, a halogen atom or a methyl group, R²³ represents an alkyleneoxy group, each of R²⁴, R²⁵ and R²⁶ represents a hydrogen atom or an alkyl group, and Q² represents an oxygen atom, a sulfur atom or —NH.

Each of R²¹ and R²² preferably represents a hydrogen atom or a methyl group. R²³ represents an alkyleneoxy group of 1 to 12 carbon atoms (preferably 1 to 9 carbon atoms). Examples of the alkyleneoxy group include alkyleneoxy groups such as ethyleneoxy, propyleneoxy, butyleneoxy, pentyleneoxy, hexyleneoxy and heptyleneoxy, and alkyleneoxy groups substituted one or more alkyleneoxy such as 2-ethyleneoxyethyleneoxy, methyleneoxypropyleneoxy, methyleneoxybutyleneoxy, methyleneoxydiethyleneoxy, methyleneoxytriethyleneoxy, ethyleneoxypropyleneoxy, propyleneoxydiethykleneoxy and methyleneoxyoctyleneoxy.

Each of R²⁴ and R²⁵ generally represents a hydrogen atom or an alkyl group (e.g., methyl, ethyl, n-propyl, isopropyl, n-butyl, pentyl, hexyl, heptyl, octyl or nonyl). Each of R²⁴ and R²⁵ preferably represents hydrogen or lower alkyl such as methyl or ethyl (especially methyl). It is especially preferred that R²⁴ is methyl and R²⁵ is hydrogen; or both R²⁴ and R²⁵ are hydrogen.

R²⁶ generally represents a hydrogen atom, an alkyl group (e.g., methyl, ethyl, n-propyl, isopropyl, n-butyl, pentyl, hexyl, heptyl, octyl or nonyl), an alkyl group having a substituent (e.g., 2-chloroethyl, 2-methoxyethyl, 2-(2-methoxyethoxy)ethyl). R²⁶ preferably represents hydrogen or lower alkyl such as methyl or ethyl (especially methyl), and especially hydrogen..

Preferred examples of R²⁰ of the formula (4) are as follows:

| Compound No. | $R^{21}$ | $R^{22}$ | $R^{23}$ | $R^{24}$ | $R^{25}$ | $R^{26}$ | $Q^2$ |
|---|---|---|---|---|---|---|---|
| TP-26 | H | H | —O—(CH$_2$)$_2$— | H | H | H | O |
| TP-27 | H | H | —O—(CH$_2$)$_3$— | H | H | H | O |
| TP-28 | H | H | —O—(CH$_2$)$_4$— | H | H | H | O |
| TP-29 | H | H | —O—(CH$_2$)$_5$— | H | H | H | O |
| TP-30 | H | H | —O—(CH$_2$)$_6$— | H | H | H | O |
| TP-31 | H | H | —O—(CH$_2$)$_7$— | H | H | H | O |
| TP-32 | H | H | —O—(CH$_2$)$_8$— | H | H | H | O |
| TP-33 | H | H | —O—(CH$_2$)$_9$— | H | H | CH$_3$ | O |
| TP-34 | H | H | —O—(CH$_2$)$_6$— | H | H | C$_2$H$_5$ | O |
| TP-35 | CH$_3$ | H | —O—(CH$_2$)$_6$— | H | H | C$_2$H$_5$ | O |
| TP-36 | CH$_3$ | CH$_3$ | —O—(CH$_2$)$_2$— | H | H | H | O |
| TP-37 | H | CH$_3$ | —O—(CH$_2$)$_3$—OCH$_2$— | H | H | H | O |
| TP-38 | CH$_3$ | H | —O—(CH$_2$)$_4$— | H | H | H | O |
| TP-39 | CH$_3$ | H | —O—(CH$_2$)$_5$— | H | H | H | O |
| TP-40 | CH$_3$ | H | —O—(CH$_2$)$_6$— | H | H | H | O |
| TP-41 | CH$_3$ | CH$_3$ | —O—(CH$_2$)$_7$— | H | H | H | O |
| TP-42 | H | CH$_3$ | —O—(CH$_2$)$_8$—OCH$_2$— | H | H | H | O |
| TP-43 | H | H | —O—(CH$_2$)$_5$— | H | H | CH$_3$ | O |
| TP-44 | CH$_3$ | H | —O—(CH$_2$)$_6$— | H | H | C$_2$H$_5$ | O |
| TP-45 | H | CH$_3$ | —O—(CH$_2$)$_6$— | H | H | H | S |
| TP-46 | H | H | —O—(CH$_2$)$_2$—OCH$_2$— | H | H | n-C$_3$H$_7$ | O |
| TP-47 | H | H | —O—(CH$_2$)$_3$—OC$_2$H$_4$— | H | H | H | O |
| TP-48 | H | H | —O—(C$_2$H$_4$O)$_2$—C$_3$H$_6$— | H | H | H | O |
| TP-49 | CH$_3$ | H | —O—(C$_2$H$_4$O)$_2$—CH$_2$— | H | H | H | O |
| TP-50 | H | H | —O—(C$_2$H$_4$O)$_3$—CH$_2$— | H | H | H | O |

| Compound No. | $R^{21}$ | $R^{22}$ | $R^{23}$ | $R^{24}$ | $R^{25}$ | $R^{26}$ | $Q^2$ |
|---|---|---|---|---|---|---|---|
| TP-51 | H | H | —O—(CH$_2$)$_2$— | H | H | H | NH |
| TP-52 | H | H | —O—(CH$_2$)$_3$— | H | H | H | NH |
| TP-53 | H | H | —O—(CH$_2$)$_4$— | H | H | H | NH |
| TP-54 | H | H | —O—(CH$_2$)$_5$— | H | H | H | NH |
| TP-55 | H | H | —O—(CH$_2$)$_6$— | H | H | H | NH |
| TP-56 | H | H | —O—(CH$_2$)$_7$— | H | H | H | NH |
| TP-57 | H | H | —O—(CH$_2$)$_8$— | H | H | H | NH |
| TP-58 | H | H | —O—(CH$_2$)$_9$— | H | H | CH$_3$ | NH |
| TP-59 | H | H | —O—(CH$_2$)$_6$— | H | H | CH$_3$ | NH |
| TP-60 | H | H | —O—(CH$_2$)$_6$— | H | H | C$_2$H$_5$ | NH |
| TP-61 | CH$_3$ | CH$_3$ | —O—(CH$_2$)$_2$— | H | H | H | NH |
| TP-62 | H | CH$_3$ | —O—(CH$_2$)$_3$— | H | H | H | NH |
| TP-63 | CH$_3$ | H | —O—(CH$_2$)$_4$— | CH$_3$ | H | H | NH |
| TP-64 | CH$_3$ | H | —O—(CH$_2$)$_5$— | H | H | H | NH |
| TP-65 | CH$_3$ | H | —O—(CH$_2$)$_6$— | H | H | H | NH |
| TP-66 | CH$_3$ | CH$_3$ | —O—(CH$_2$)$_6$— | H | H | H | NH |
| TP-67 | H | CH$_3$ | —O—(CH$_2$)$_6$— | H | H | H | NH |
| TP-68 | H | H | —O—(CH$_2$)$_2$—OCH$_2$— | H | H | H | NH |
| TP-69 | CH$_3$ | H | —O—(CH$_2$)$_6$— | H | H | CH$_3$ | NH |
| TP-70 | CH$_3$ | H | —O—(CH$_2$)$_6$— | H | H | H | NH |
| TP-71 | H | H | —O—(CH$_2$)$_2$— | H | H | n-C$_3$H$_7$ | NH |
| TP-72 | H | H | —O—(CH$_2$)$_3$— | H | H | H | NH |
| TP-73 | H | H | —O—(C$_2$H$_4$O)$_2$—CH$_2$— | H | H | H | NH |
| TP-74 | CH$_3$ | H | —O—(C$_2$H$_4$O)$_2$—CH$_2$— | H | H | H | NH |
| TP-75 | H | H | —O—(C$_2$H$_4$O)$_3$—CH$_2$— | H | H | H | NH |

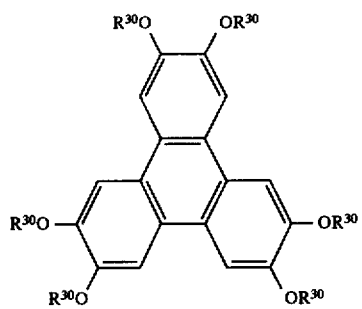

(5)

wherein $R^{30}$ is the following group:

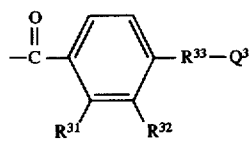

in which each of $R^{31}$ and $R^{32}$ represents independently a hydrogen atom, a halogen atom or a methyl group, and $R^{33}$ represents an alkyleneoxy group, and $Q^3$ represents an acid anhydride group and an activated ester group.

$R^{31}$ and $R^{32}$ preferably represent a hydrogen atom or a methyl group. $R^{33}$ represents an alkyleneoxy group of 1 to 12 carbon atoms (preferably 1 to 9 carbon atoms). Examples of the alkyleneoxy group include alkyleneoxy groups such as ethyleneoxy, propyleneoxy, butyleneoxy, pentyleneoxy, hexyleneoxy and heptyleneoxy, and alkyleneoxy groups substituted one or more alkyleneoxy such as 2-ethyleneoxyethyleneoxy, methyleneoxypropyleneoxy, methyleneoxybutyleneoxy, methyleneoxydiethyleneoxy or methyleneoxytriethyleneoxy.

In $Q^3$, examples of the acid anhydride group include symmetric acid anhydride type-groups such as alkylcarbonyloxy (e.g., R—COOCO-alkyl) and arylcarbonyloxy (e.g., R—COOCO-aryl), and a mixed acid hydride type-groups such as methanesulfonyloxy (e.g., R—COOSO$_2$CH$_3$), trifluoroacetyloxy (e.g., R—COOCOCF$_3$) and ethyloxycarbonyloxy (e.g., R—COOCOOCH$_3$). Examples of the activated ester bonding group such as 4-nitrophenoxy and N-oxysuccinic acid imide. Examples of the acid anhydride Group and activated ester bonding Group further are described in "Synthesis of Peptide", N. Izumiya, Chapter 5, Maruzen, 1975).

Preferred examples of $R^{30}$ of the formula (5) are as follows:

| Compound No. | $R^{31}$ | $R^{32}$ | $R^{33}$ | $Q^3$ |
|---|---|---|---|---|
| TP-76 | H | H | —O—(CH$_2$)$_2$— | —COOCOCH$_3$ |
| TP-77 | H | H | —O—(CH$_2$)$_3$— | —COOSO$_2$CH$_3$ |
| TP-78 | H | H | —O—(CH$_2$)$_4$— | —COOCOCH$_3$ |
| TP-79 | H | H | —O—(CH$_2$)$_5$— | —COOCOCH$_3$ |
| TP-80 | H | H | —O—(CH$_2$)$_6$— | —COOCOCH$_3$ |
| TP-81 | H | H | —O—(CH$_2$)$_7$— | —COOCOCH$_3$ |
| TP-82 | H | H | —O—(CH$_2$)$_8$— | —COCCOCH$_3$ |
| TP-83 | H | H | —O—(CH$_2$)$_9$— | —COOCOCH$_3$ |
| TP-84 | H | H | —O—(CH$_2$)$_6$— | —COOSO$_2$CH$_3$ |
| TP-85 | H | Cl | —O—(CH$_2$)$_6$— | —COOCOC$_2$H$_5$ |
| TP-86 | CH$_3$ | CH$_3$ | —O—(CH$_2$)$_2$— | —COCCOCH$_3$ |
| TP-87 | H | CH$_3$ | —O—(CH$_2$)$_3$— | —COOCOCH$_3$ |
| TP-88 | CH$_3$ | H | —O—(CH$_2$)$_4$— | —COOCOCH$_3$ |
| TP-89 | CH$_3$ | H | —O—(CH$_2$)$_5$— | —COOCOCH$_3$ |

| Compound No. | $R^{31}$ | $R^{32}$ | $R^{33}$ | $Q^3$ |
|---|---|---|---|---|
| TP-90 | CH$_3$ | H | —O—(CH$_2$)$_6$— | —COOCOCH$_3$ |
| TP-91 | CH$_3$ | CH$_3$ | —O—(CH$_2$)$_6$— | —COOCOCH$_3$ |
| TP-92 | H | CH$_3$ | —O—(CH$_2$)$_6$— | —COOCOCH$_3$ |
| TP-93 | H | H | —O—(CH$_2$)$_3$—OCH$_2$— | —COOCOCH$_3$ |
| TP-94 | CH$_3$ | H | —O—(CH$_2$)$_6$— | —COOSO$_2$CH$_3$ |
| TP-95 | H | F | —O—(CH$_2$)$_6$— | —COO—N(succinimide) |
| TP-96 | H | H | —O—(CH$_2$)$_2$— | —COOCOOC$_2$H$_5$ |
| TP-97 | H | H | —O—(CH$_2$)$_4$—OCH$_2$— | —COOCOCH$_3$ |
| TP-98 | H | H | —O—(C$_2$H$_4$O)$_2$—CH$_2$— | —COOCOCH$_3$ |
| TP-99 | CH$_3$ | H | —O—(C$_2$H$_4$O)$_2$—CH$_2$— | —COOCOCH$_3$ |
| TP-100 | H | H | —O—(C$_2$H$_4$O)$_3$—CH$_2$— | —COOCOCH$_3$ |

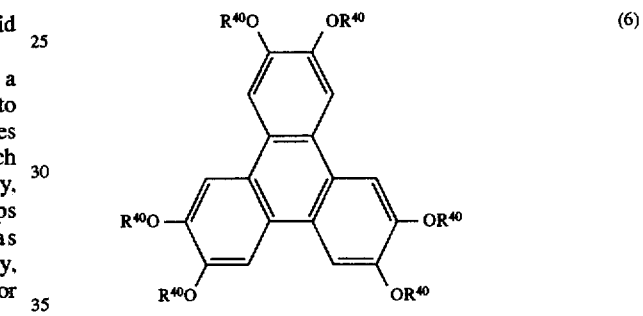

(6)

wherein $R^{40}$ is the following group:

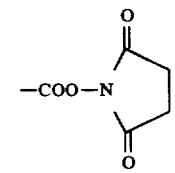

in which each of $R^{41}$ and $R^{42}$ represents independently a hydrogen atom, a halogen atom or a methyl group, and $R^{43}$ represents an alkyleneoxy group, and Nu represents a nucleophilic group.

$R^{41}$ and $R^{42}$ preferably represent a hydrogen atom or a methyl group. $R^{43}$ represents an alkyleneoxy group of 1 to 12 carbon atoms (preferably 1 to 9 carbon atoms). Examples of the alkyleneoxy group include alkyleneoxy groups such as ethyleneoxy, propyleneoxy, butyleneoxy, pentyleneoxy, hexyleneoxy and heptyleneoxy, alkyleneoxy groups having one or more alkyleneoxy such as 2-ethyleneoxyethyleneoxy, methyleneoxypropyleneoxy, methyleneoxybutyleneoxy, methyleneoxydiethyleneoxy or methyleneoxytriethyleneoxy.

$Q^4$ preferably represents an amino group, a hydroxyl group, a mercapto group, a carboxyl group, an oxide anion group, a sulfide anion or a carboxylato anion group.

Preferred examples of $R^{40}$ of the formula (6) are as follows:

| Compound No. | $R^{41}$ | $R^{42}$ | $R^{43}$ | Nu |
|---|---|---|---|---|
| TP-101 | H | H | —O—(CH$_2$)$_2$— | NH$_2$ |
| TP-102 | H | H | —O—(CH$_2$)$_3$— | OH |
| TP-103 | H | H | —O—(CH$_2$)$_4$— | OH |
| TP-104 | H | H | —O—(CH$_2$)$_5$— | OH |
| TP-105 | H | H | —O—(CH$_2$)$_6$— | OH |
| TP-106 | H | H | —O—(CH$_2$)$_7$— | OH |
| TP-107 | H | H | —O—(CH$_2$)$_8$— | SH |
| TP-108 | H | H | —O—(CH$_2$)$_9$— | SH |
| TP-109 | H | H | —O—(CH$_2$)$_6$— | NH$_2$ |
| TP-110 | CH$_3$ | H | —O—(CH$_2$)$_6$— | COOH |
| TP-111 | CH$_3$ | CH$_3$ | —O—(CH$_2$)$_2$— | OH |
| TP-112 | H | CH$_3$ | —O—(CH$_2$)$_3$— | OH |
| TP-113 | CH$_3$ | H | —O—(CH$_2$)$_4$— | SH |
| TP-114 | CH$_3$ | H | —O—(CH$_2$)$_5$— | SH |
| TP-115 | CH$_3$ | H | —O—(CH$_2$)$_6$— | OH |
| TP-116 | CH$_3$ | CH$_3$ | —O—(CH$_2$)$_7$— | SH |
| TP-117 | H | CH$_3$ | —O—(CH$_2$)$_8$— | OH |
| TP-118 | CH$_3$ | H | —O—(CH$_2$)$_9$— | OH |
| TP-119 | CH$_3$ | H | —O—(CH$_2$)$_6$— | NH$_2$ |
| TP-120 | H | CH$_3$ | —O—(CH$_2$)$_6$— | COOH |
| TP-121 | H | H | —O—(CH$_2$)$_2$— | OH |
| TP-122 | H | H | —O—(CH$_2$)$_3$—OC$_2$H$_4$— | NH$_2$ |
| TP-123 | H | H | —O—(C$_2$H$_4$O)$_2$—C$_3$H$_6$— | NH$_2$ |
| TP-124 | CH$_3$ | H | —O—(C$_2$H$_4$O)$_2$—CH$_2$— | COOH |
| TP-125 | H | H | —O—(C$_2$H$_4$O)$_3$—CH$_2$— | OH |
| TP-126 | H | H | —O—(CH$_2$)$_4$— | NH$_2$ |
| TP-127 | H | H | —O—(CH$_2$)$_5$— | NH$_2$ |
| TP-128 | H | H | —O—(CH$_2$)$_6$— | SH |
| TP-129 | H | H | —O—(CH$_2$)$_7$— | COOH |
| TP-130 | H | H | —O—(CH$_2$)$_8$— | COOH |

In addition to the examples, preferred examples of the discotic compounds of the invention are described below.

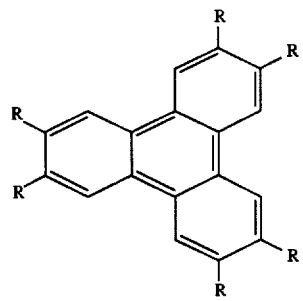
(A)

preferred examples of R of the above formula (A) are as follows:

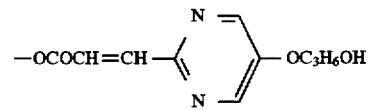
TP-131

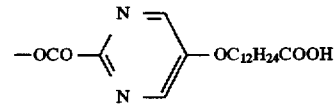
TP-132

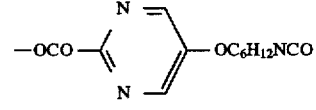
TP-133

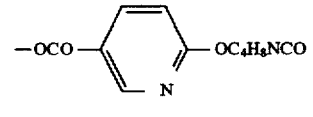
TP-134

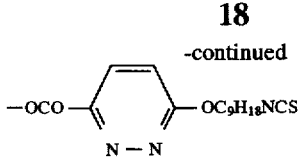
TP-135

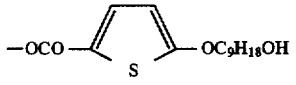
TP-136

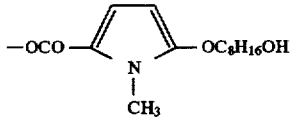
TP-137

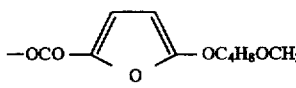
TP-138

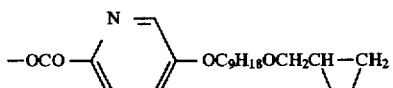
TP-139

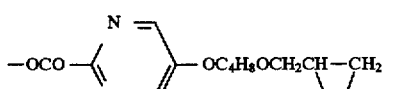
TP-140

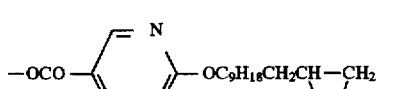
TP-141

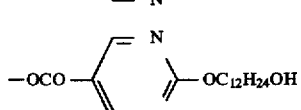
TP-142

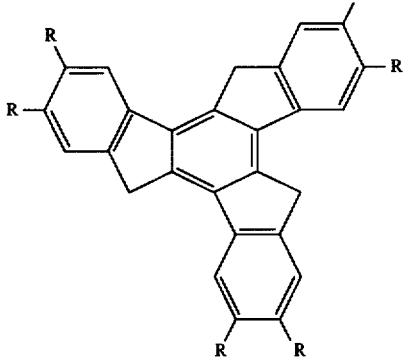
(B)

Preferred examples of R of the above formula (B) are as follows:

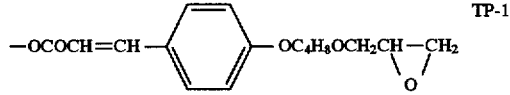
TP-143

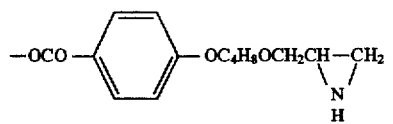
TP-144

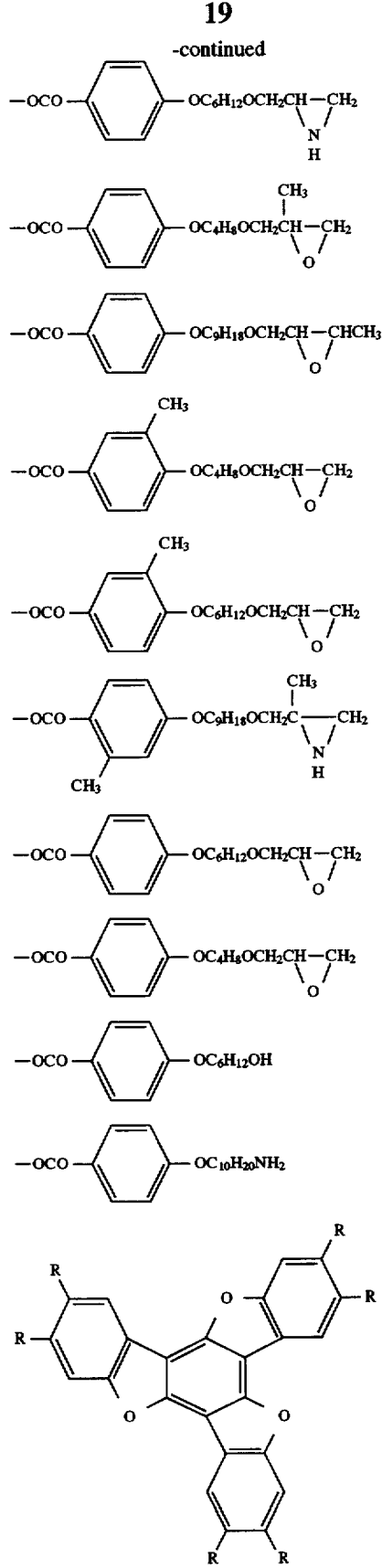
Preferred examples of R of the above formula (C) are as follows:

-continued
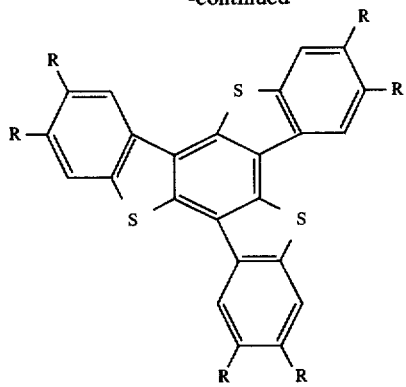
(D)
Preferred examples of R of the above formula (D) are as follows:
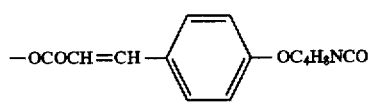 TP-167
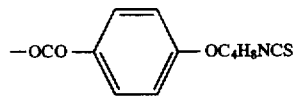 TP-168
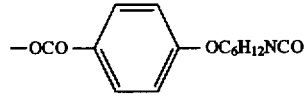 TP-169
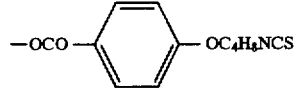 TP-170
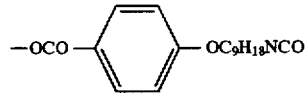 TP-171
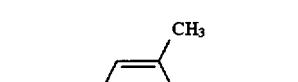 TP-172
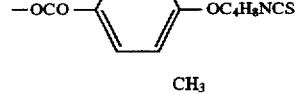 TP-173
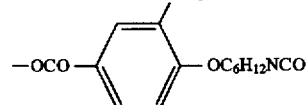 TP-174
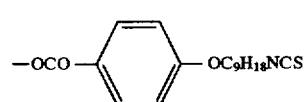 TP-175
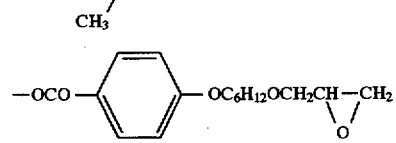
-continued
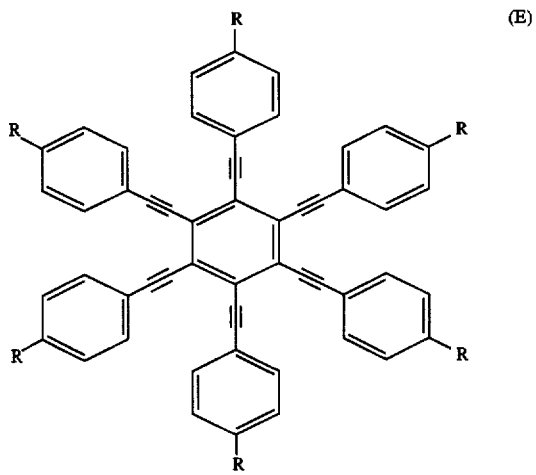 TP-176
—OCO—⬡—OC$_6$H$_{12}$SH  TP-177
—OCO—⬡—OC$_{10}$H$_{20}$SH  TP-178
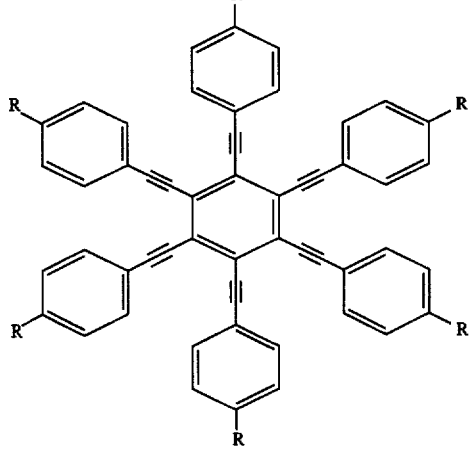
(E)
Preferred examples of R of the above formula (E) are as follows:
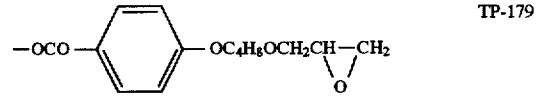 TP-179
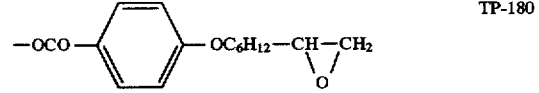 TP-180
—OC$_{12}$H$_{24}$OH  TP-181
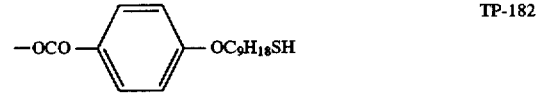 TP-182
—OC$_{18}$H$_{36}$NH$_2$  TP-183
—OC$_6$H$_{12}$NCO  TP-184
—OC$_9$H$_{18}$OCCH$_2$CH—CH$_2$  TP-185

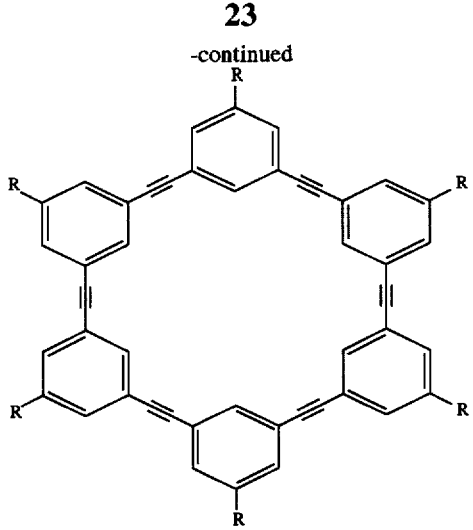
(F)

Preferred examples of R of the above formula (F) are as follows:

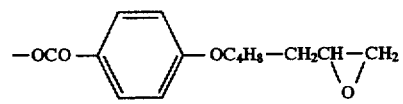 TP-186

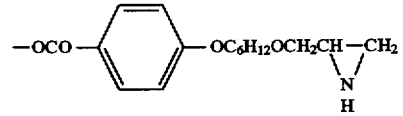 TP-187

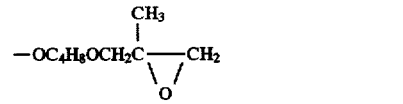 TP-188

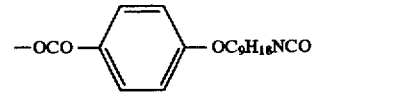 TP-189

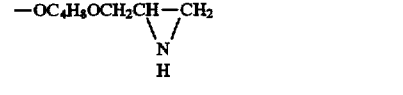 TP-190

—OC$_6$H$_{12}$NCO  TP-191

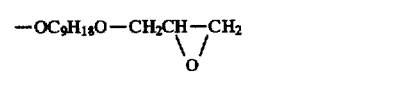 TP-192

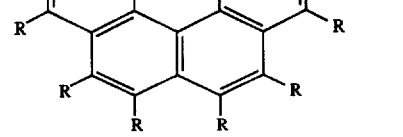
(G)

Preferred examples of R of the above formula (G) are as follows:

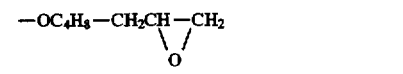 TP-193

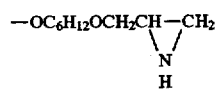 TP-194

—OC$_{10}$H$_{20}$OH  TP-195

—OC$_{16}$H$_{32}$COOH  TP-196

—OC$_9$H$_{18}$SH  TP-197

—OC$_6$H$_{12}$NCO  TP-198

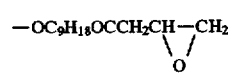 TP-199

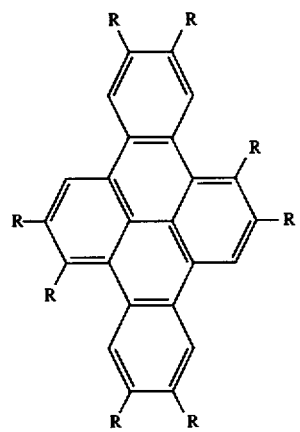
(H)

Preferred examples of R of the above formula (H) are as follows:

—OCO—⟨C$_6$H$_4$⟩—OC$_4$H$_8$OCH$_2$CH—CH$_2$  TP-200

—OCO—⟨C$_6$H$_4$⟩—OC$_6$H$_{12}$NCO  TP-201

—OC$_4$H$_8$OCH$_2$C(CH$_3$)—CH$_2$ (epoxide)  TP-202

—OCO—⟨C$_6$H$_4$⟩—OC$_9$H$_{18}$NCS  TP-203

—OC$_{12}$H$_{24}$OH  TP-204

—OC$_{16}$H$_{32}$COOH·N(C$_2$H$_5$)$_3$  TP-205

—OC$_9$H$_{18}$OCCH$_2$CH—CH$_2$  TP-206

-continued

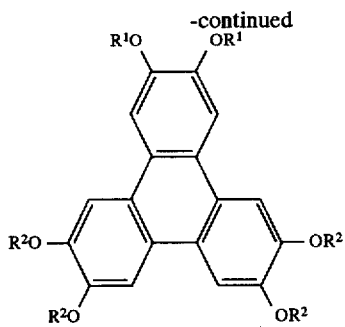

TP-207

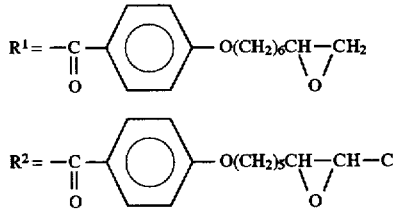

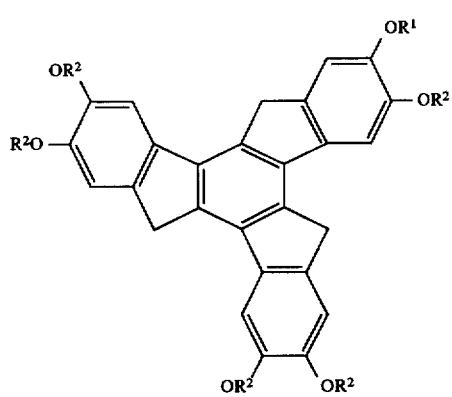

TP-208

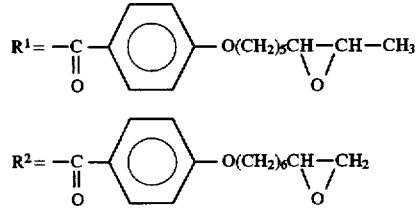

Non-discotic compounds (compounds having no discotic structure unit) employable for forming the optically anisotropic layer are generally represented by the formula (7):

(7)

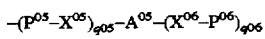

$$-(P^{05}-X^{05})_{q05}-A^{05}-(X^{06}-P^{06})_{q06}$$

wherein $P^{05}$ represents one group selected from the group consisting an isocyanato group, a thiocyanato group, an oxiranyl group, an azyridinyl group, a thiiranyl group, an acid anhydride group and an activated ester group or a nucleophilic group; $P^{06}$ represents a nucleophilic group; $X^{05}$ and $X^{06}$ each represents a divalent connective group or a chemical bond, q05 and q06 are an integer of 0 to 8 under the condition of q05+q06≧1; and $A^{05}$ represents a mono- to octa- valent group of a chain or cyclic aliphatic hydrocarbon, an aromatic ring or a heterocyclic ring.

Each of q05 and q06 preferably is an integer of 2 to 4. One of q05 and q06 preferably is 0.

The chain aliphatic hydrocarbon group represented by $A^{05}$ generally is a linear or branched mono- to octa- valent group having 1 to 24 carbon atoms, preferably 3 to 12 carbon atoms. The chain aliphatic hydrocarbon group may have a substituent.

The cyclic aliphatic hydrocarbon group represented by $A^{05}$ generally is a mono- to octa- valent group having 3 to 24 carbon atoms, preferably 5 to 18 carbon atoms. The cyclic aliphatic hydrocarbon group may have a substituent.

The aromatic ring group represented by $A^{05}$ generally is a mono- to octa- valent group having 6 to 24 carbon atoms, preferably 6 to 12 carbon atoms. The aromatic ring preferably are diaryl (e.g., biphenyl), arylalkenylarene (e.g., styrylbenzene), arylalkynylarene (e.g., phenylethynylbenzene), aralkylarene (e.g., phenylmethyl, dimethylphenylmethyl), phenylazobenzene, phenylthiobenzene, benzylydeneiminobenzene, phenyliminophenylsulfonylbenzene and benzoyloxyethyleneoxycarbonylbenzene.

$A^{05}$ generally is di- to tetra- valent group.

Examples of groups of $A^{05}$ are described below.

   A-1

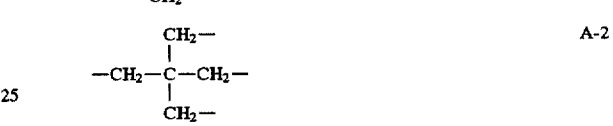   A-2

   A-3

   A-4

   A-5

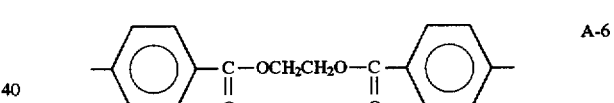   A-6

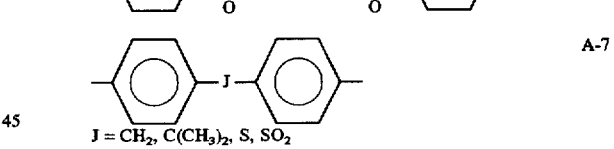   A-7

   A-8

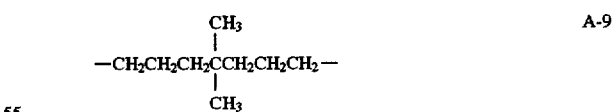   A-9

   A-10

   A-11

   A-12

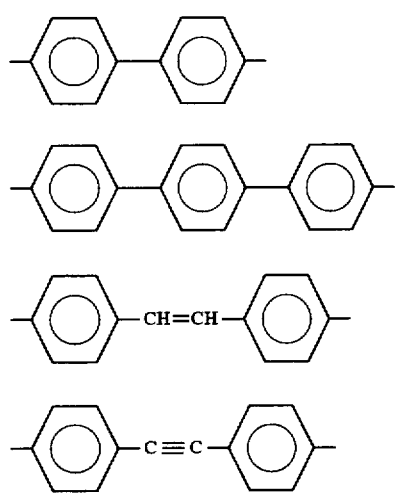
A-13
A-14
A-15
A-16
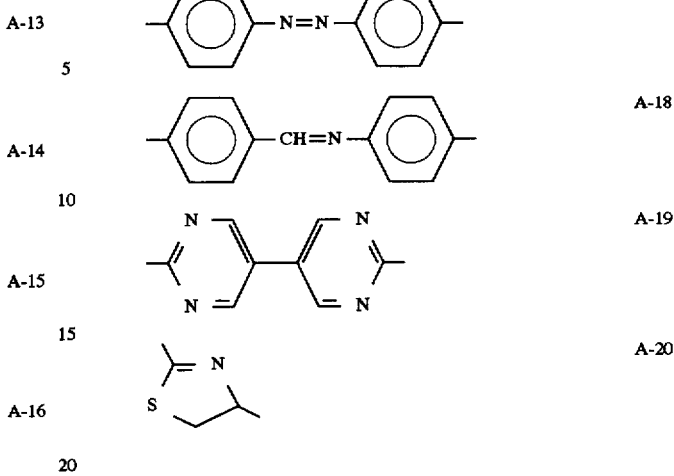
A-17
A-18
A-19
A-20
Preferred examples of the non-discotic compounds represented by the formula (7) are as follows:
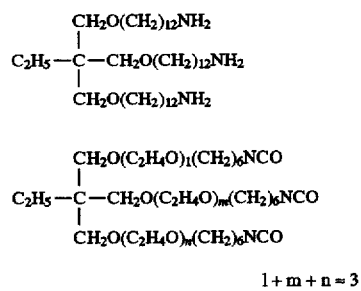
F-1
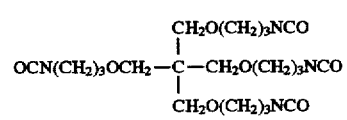
$1+m+n=3$
F-2
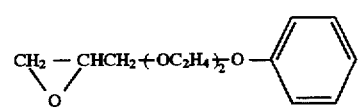
F-3
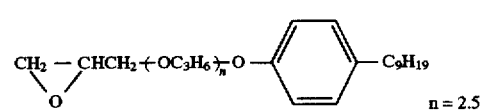
F-4
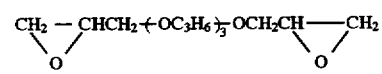
$n = 2.5$
F-5
F-6
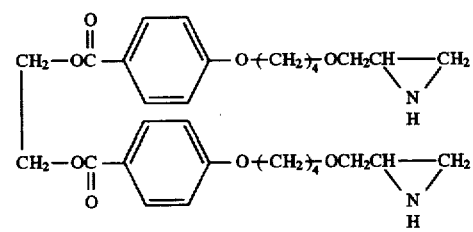
F-7

-continued
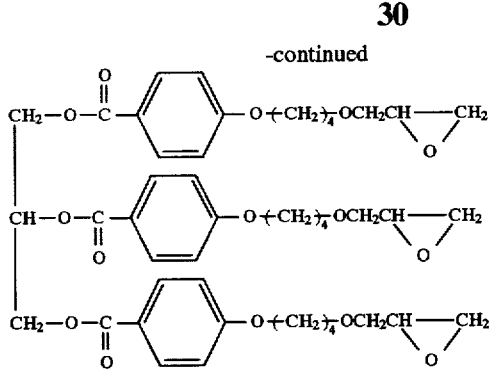 F-8
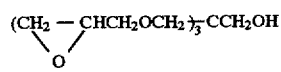 F-9
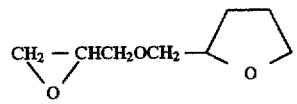 F-10
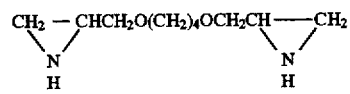 F-11
(OCN(CH$_2$)$_6$OCH$_2$)$_2$C(CH$_3$)$_2$   F-12
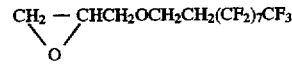 F-13
OCN(CH$_2$)$_7$O(CH$_2$CH$_2$O)$_2$CH$_2$CH$_3$   F-14
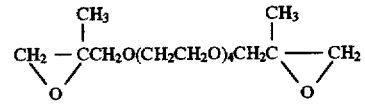 F-15
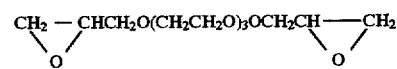 F-16
OCN(CH$_2$)$_6$NCO   F-17
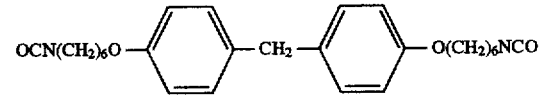 F-18
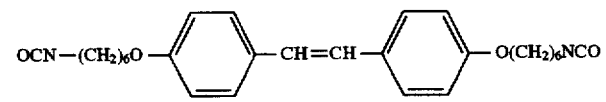 F-19
C$_2$H$_5$—C—(CH$_2$OH)$_3$   G-1
C$_2$H$_5$—C—{CH$_2$O(C$_2$H$_4$O)$_2$H}$_3$   G-2
HO(CH$_2$)$_4$OH   G-3
HO(C$_2$H$_4$O)$_2$H   G-4
(HOCH$_2$CH$_2$)$_3$CCH$_2$OH   G-5
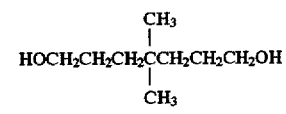 G-6
HO(C$_3$H$_6$O)$_2$H   G-7
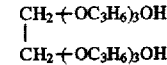 G-8

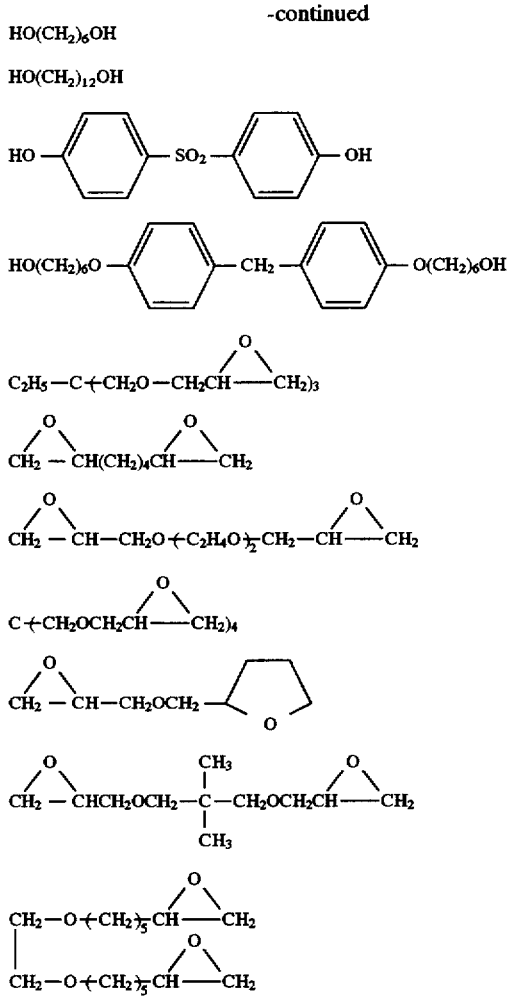

Of the compounds, the mono-functional compounds (e.g., F-4, F-5, F-9, F-10, F-13), can be employed together with the multi-functional compounds.

The optical compensatory sheet of the invention is generally composed of a transparent support and the above optically anisotropic layer thereon, and it is preferred that an orientation layer is further provided between the support and the optically anisotropic layer. The orientation layer may be provided on the optically anisotropic layer in the case that the optically anisotropic layer plurally provided on the support. A protective film or the support may be provided on the layer or on another side of the support.

As material of the transparent support of the invention, any material can be employed so long as it is transparent. The material preferably has a transmittance of not less than 80% and specially shows optical isotropy when it is viewed from a front side. Further, the film preferably has a negative uniaxial property and an optic axis in the normal line direction.

Therefore, the film is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyallylate, polysulfone and polyethersulfone can be also employed by rendering the materials optically isotropic by appropriately controlling molecular orientation in a procedure of forming a film.

The transparent film generally satisfies the condition of:

$$|nx-ny|/|nx-nz| \leq 0.2$$

in which nx and ny is main refractive indices within the film and nz is a main refractive index in a thickness direction of the film.

The transparent film preferably satisfies the condition of:

$$0 \leq |nx-ny| \times d \leq 50 \text{ (nm)}$$

and more preferably:

$$0 \leq |nx-ny| \times d \leq 20 \text{ (nm)}$$

in which nx and ny has the same meanings as above and d is a thickness direction of the film.

Especially, the transparent film preferably satisfies the condition of:

$$20 \leq |(nx+ny)/2-nz| \times d \leq 400 \text{ (nm)}$$

in which nx, ny and nz have the same meanings as above, whereby the viewing angle can be greatly increased. Further, the transparent film preferably satisfies the condition of:

$$30 \leq |(nx+ny)/2-nz| \times d \leq 150 \text{ (nm)}$$

"nx", "ny", "nz" and "d" described above are shown in FIG. 1. "nx" and "ny" are main refractive indices on the plane of the film, "nz" is a main refractive index in a thickness direction of the transparent film and d is the thickness of the film.

The orientation layer is generally provided on the transparent support. The orientation layer has a function of defining an orientation direction of a discotic liquid crystal provided thereon by a coating method, and the orientation gives an optic axis (or direction showing minimum retardation) inclined (preferably at 5 to 50 degrees) from an optical compensatory sheet. As the orientation layer, any layers can be employed so long as they are capable of imparting orientation property to a layer of liquid crystal. Preferred examples of the orientation layer include a layer of an organic compound (preferably polymer) subjected to rubbing treatment, an obliquely deposited layer of an inorganic compound, and a layer having micro grooves. Further, a built-up film formed according to LangmuirBlodgett technique (LB technique) from ω-tricosanoic acid, dioctadecyldimethylammoniumchloride, methyl stearate or an azobenzene derivative, that is isomerized by means of light to form a thin film of the molecules tilted uniformly in a certain direction, can be used as the orientation layer. Furthermore, a thin film of polyvinyl alcohol which is stretched 4 to 5 times can be employed as the orientation layer (rubbed polymer layer). Otherwise, a support such as a glass plate a surface of which is directly rubbed can be employed as a support having orientation layer.

In addition, a layer prepared by orienting dielectric materials by application of electric field or magnetic field can be employed as the orientation layer.

Preferred examples of polymers for the orientation layer include polyimide, polystyrene, gelatin, polyvinyl alcohol and polyvinyl alcohol having an alkyl group (preferably having 6 or more carbon atoms). Orientation layers obtained by subjecting films of these polymers to orientation treatment, are capable of tilting obliquely discotic liquid crystal. Further, silylated agent treated glass plate can be employed as the support having the orientation layer.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100 to 300° C. for 0.5 to 1 hour, and rubbing a surface of the resultant polyimide film.

The orientation layer for the discotic liquid crystal can be rubbed in the known manner which is conventionally employed to prepare an orientation layer for liquid crystal of LCD. In more detail, the treatment is to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as SiO, TiO$_2$, MgF$_2$ and ZnO$_2$ and metals such as Au and Al (preferably SiO). As the inorganic compound, any compounds can be employed so long as they have high dielectric constant (permittivity). The obliquely deposited layer of an inorganic compound can be prepared using the metallizing apparatus. The support may be metallized in the fixed condition, or the continuous support may be continuously metallized to give a continuous layer.

Other methods for orienting a layer of discotic compound having liquid crystalline property with using the orientation layer, include those applying magnetic field or electric field to the layer provided on a support at desired angle under heating for forming discotic nematic phase.

The optical compensatory sheet is preferably prepared by forming an orientation layer on a transparent support and forming an optically anisotropic layer on the orientation layer, as mentioned above.

The optical compensatory sheet is, for example, formed by coating a coating liquid containing a discotic or non-discotic compound having functional groups (e.g., isocyanato, isothiocyanato, oxiranyl) and a discotic or non-discotic compound having nucleophilic groups (e.g., hydroxyl, amino, carboxyl) on the transparent to form a coated layer, heating the coated layer to form a discotic liquid crystalline phase (e.g., discotic nematic phase or mono-axial columnar phase); heating these compounds to polymerize and cooling the cured layer to form an optically anisotropic layer (e.g., polyether layer, polyurethane layer, polyester layer, polyamide layer). At least one of the two compounds is a discotic compound (preferably has liquid crystalline property). Otherwise, instead of the two compounds, a discotic compound having both the functional group and nucleophilic group can be employed.

The coating liquid can be prepared by mixing these compounds by the use of a mortar, a ball mill or paint shaker; by melting these compounds under heating to stir the molten compounds; or by dissolving each of these compounds in a solvent to prepare these solutions and mixing them.

A coating liquid for forming the optically anisotropic layer generally contains a discotic compound and non-discotic compound at a weight ratio of 50:50 to 100:0 (discotic:non-discotic), preferably 60:40 to 100:0, and especially 80:20 to 100:0. The discotic compound preferably is a discotic liquid crystalline compound.

Examples of the solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof include a curtain coating method, an extrusion coating method, a roll coating method, a dip coating method, a spin coating method, a print coating method, a coating method using slide coater and a spray coating method. A vapor deposition method may be used.

Generally, the heat treatment for forming discotic liquid crystalline phase is conducted at a temperature of 50° C. to 250° C., especially 80° C. to 160° C. Further, the heat treatment is preferably conducted for 10 seconds to 60 minutes, especially 20 seconds to 3 minutes.

The optical compensatory sheet is, preferably, formed by coating a coating liquid containing the discotic compound having functional groups and the discotic compound and/or non-discotic compound having nucleophilic groups on the orientation layer provided on the transparent to form a coated layer (at least one of the compounds being a discotic compound), heating the coated layer to form a discotic liquid crystalline phase (e.g., discotic nematic phase) for a certain time period; heating these compounds to cause reaction of the functional group and the nucleophilic group, whereby a new bonding is formed; and cooling the cured layer to form an optically anisotropic layer (e.g., polyether, polyester layer, polyurethane layer, polyamide layer). The resultant optically anisotropic layer has enlarged viewing angle and high durability (e.g., excellent heat resistance). Material for forming the optically anisotropic layer can be selected from a variety of discotic compounds and monomers and therefore the layer having desired chemical and physical properties can be formed.

The reaction (polymerization) of these compounds is performed after the layer of these compounds forms preferred oriented condition (i.e., monodomain oriented condition).

Materials to promote the reaction may be added to the compounds having functional or nucleophilic group.

Examples of the materials include bases such as hydroxides (e.g., potassium hydroxide and ammonium hydroxide), alkoxides (e.g., sodium methoxide, sodium ethoxide and potassium t-butoxide), metal hydrides (e.g., sodium hydride and calcium hydride), amines (e.g., pyrridine, triethylamine, piperidine, 1,8-diazabicyclo[5,4,0]-7-undecene (DBU), tetramethylbutane diamine (TMBDA) and 1,4-diaza[2,2,2] bicyclooctan (DABCO)), carbonates (e.g., sodium carbonate, potassium carbonate and sodium hydrogencarbonate), and acetates (e.g., sodium acetate and potassium acetate);

- metallic compounds such as di-n-butyltin dilaurate, tin octaonate and acetyliacetonatozinc; and
- acids such as mineral acids (e.g., sulfuric acid and hydrochloric acid), carboxylic acids (e.g., chloroacetic acid, trifluoroacetic and salisylic acid), and sulfonic acids (e.g., methanesulfonic acid, benzenesulfonic acid and p-toluenesulfonic acid).

A thickness of the compensatory sheet generally is so determined as to equal to the product of birefringence of the layer and the thickness to the retardation of the liquid crystal cell. The thickness generally is in the range of 0.1 to 10 μm, preferably 1 to 3 μm.

Figure 2:
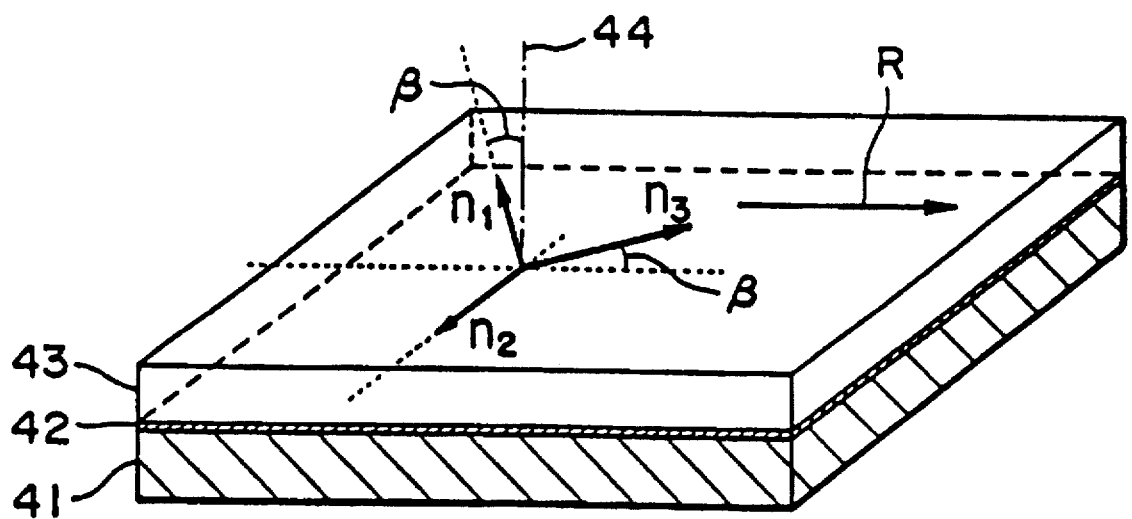
FIG. 2 is a view schematically showing the refractive indices of the three axes of the optical compensatory sheet of the invention.

The representative structure of the optical compensatory sheet employed in the invention is shown in FIG. 2. In FIG. 2, a transparent support 41, an orientation layer 2 and an optical anisotropic layer 43 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number β is an inclined angle of the optic axis (or direction of minimum retardation) from the normal 44 of the optical compensatory sheet.

The negative uniaxial property, that the optical compensatory sheet of the invention generally has, means property as satisfies the condition of:

$$n_1 < n_2 = n_3$$

in which $n_1$, $n_2$ and $n_3$ are refractive indices in the three axes directions of a optical compensatory sheet and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical use as long as the negative uniaxial property satisfies the condition of:

$$|n_2 - n_3|/|n_2 - n_1| \leq 0.2$$

in which $n_1$, $n_2$ and $n_3$ have the meanings described above.

In order to greatly improve the viewing angle characteristics of TN-LCD or TFT-LCD, the optic axes of the optical compensatory sheet is generally inclined at 5 to 50 degrees from a normal line of the sheet (β in FIG. 2), preferably 10 to 40 degrees and especially 10 to 30 degrees.

Further, it is preferred that the sheet satisfies the condition of:

$$50 \leq [(n_3 + n_2)/2 - n_1] \times D \leq 400 \text{ (nm)}$$

in which D is a thickness of the sheet; and especially the condition of:

$$100 \leq [(n_3 + n_2)/2 - n_1] \times D \leq 400 \text{ (nm)}$$

The protective film may be provided on the discotic liquid crystal layer or on the reverse side (side having no layer) of the transparent support. Examples of material of the protective film include polymethyl metacrylate, acrylic acid/methacrylic acid copolymer, styrene/maleinimide anhydride copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate.

Figure 3:
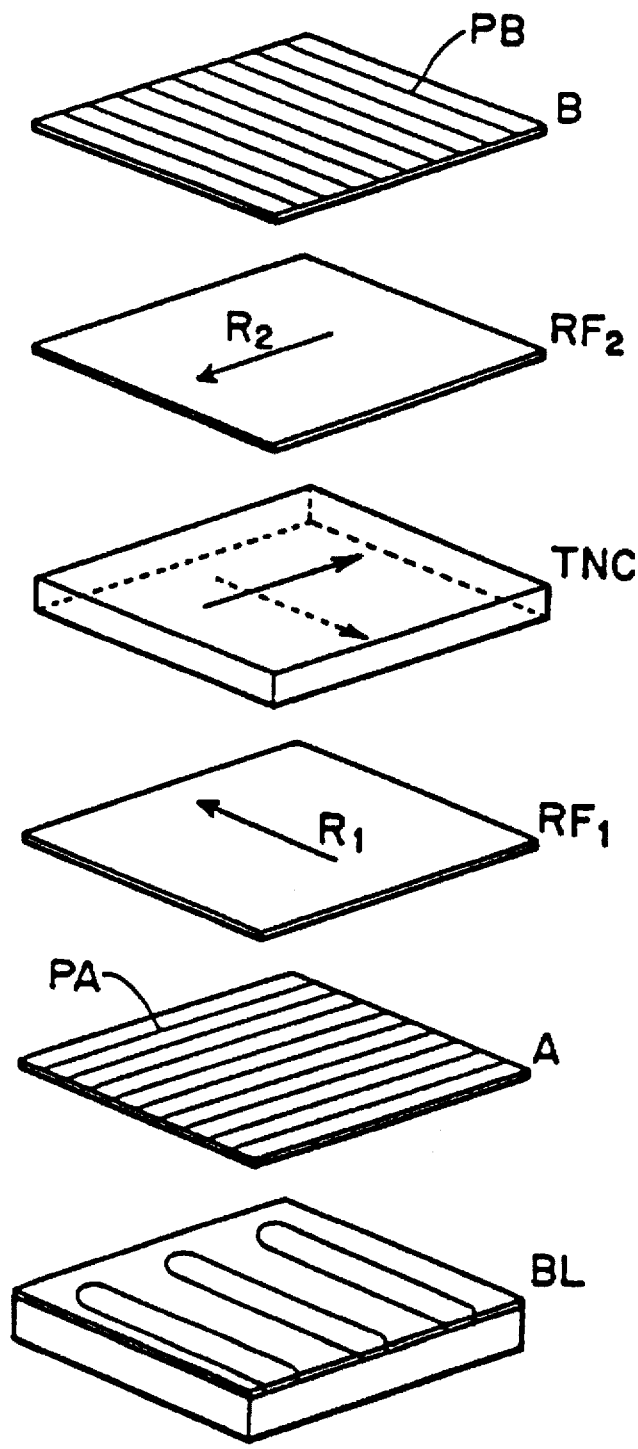
FIG. 3 is a view schematically showing the representative structure of the liquid crystal display of the invention.

The representative structure of the liquid crystal display of the invention is shown in FIG. 3. In FIG. 3, a liquid crystal cell TNC comprising a pair of substrates provided with a transparent electrode and a twist-oriented nematic liquid crystal sealed therebetween, a pair of polarizing sheets A and B arranged on the both sides of the cell, the optical compensatory sheets RF1 and RF2 between the liquid crystal cell and the polarizing sheet and back light BL are assembled to constitute the liquid crystal display. The optical compensatory sheet may be arranged only on one side (i.e., use of one of RF1 and RF2). The reference number $R_1$ is a rubbing direction of the orientation layer of the optical compensatory sheets RF1, and the reference number R2 is the rubbing direction of the orientation layer of the optical compensatory sheets RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

Figure 4:
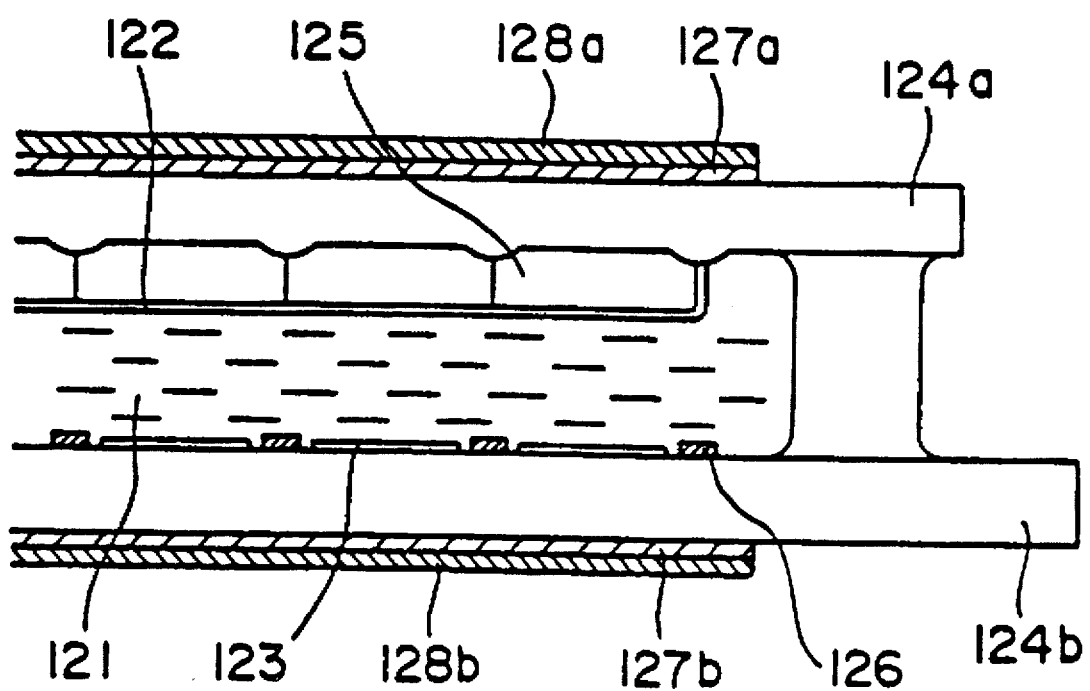
FIG. 4 is a view schematically showing the representative structure of the color liquid crystal display of the invention.

Further, the representative structure of the color liquid crystal display of the invention is shown in FIG. 4. In FIG. 4, a liquid crystal cell comprising a glass substrate 124a provided with an opposite transparent electrode 122 and color filter 125, a glass substrate 124b provided with an electrode for picture element 123 and TFT (thin-film-transistor) 126, and twist-oriented nematic liquid crystal 121 sealed between the substrates, a pair of polarizing plates 128a and 128b arranged on both sides of the cell, and a pair of optical compensatory sheets 127a and 127b provided between the liquid crystal cell and the polarizing plate are assembled to constitute the color liquid crystal display. The optical compensatory sheet may be arranged only on one side (i.e., use of one of 128a and 128b).

The reason why the optical compensatory sheet indicated in FIG. 2 gives much increase of viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal to a surface of the cell. When an intermediate gradation is displayed, optic axes of the optically anisotropic substances are further inclined from the normal to a surface of the cell.

In the case that an optic axis of the TN-type liquid crystal cell is inclined from the normal to a surface of the cell, use of a optically anisotropic substance having an optic axis in a normal direction is considered not to appropriately compensate the phase difference by the cell. In other words, an optically anisotropic substance is needed for the cell to have an optic axis inclined from the normal. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal (i.e., optical compensatory sheet of the invention) improves viewing angle characteristics.

Furthermore, it is mere approximation that the liquid crystal cell behaves as optically anisotropic substance with a positive uniaxial property having optic axis inclined from the normal. Therefore, use of the optically anisotropic substance does not give much satisfactorily compensation of phase difference.

Thus, the TN-type liquid crystal cell is preferably regarded as a composite of two optically anisotropic substances having a positive uniaxial property which has a inclined angle equal to each other and inclination direction differing from each other. In the case that the TN-type liquid crystal cell is considered as above, great improvement of viewing angle characteristics can be obtained by employing the optical compensatory sheet which is prepared by, for example, superposing an optically anisotropic substance (optically anisotropic layer) having an optically negative monoaxial and an optic axis inclined to the normal, on an optically anisotropic substance (transparent support) having an optically negative monoaxial and an optic axis in the normal direction.

As materials of liquid crystal employed for the liquid crystal cell, any known materials can be employed so long as they are TN—CL or STN—CL.

Examples of the present invention and comparison examples are given below, but these examples by no means restrict the invention.

EXAMPLE 1

Preparation of cured optically anisotropic layer

On a subbing layer of gelatin (0.1 μm) provided on triacetylcellulose film (TAC) (thickness: 100 μm; Fuji Tack, available from Fuji Photo Film Co., Ltd.), the following coating solution of modified polyvinyl alcohol was coated, dried using warm air (90° C.) to form a polymer layer having a thickness of 0.8 μm.

| [Coating solution for forming orientation layer] | |
|---|---|
| Modified polyvinyl alcohol (MP-203, available from Kuraray Co., Ltd.) | 1.0 g |
| Water | 18.0 g |
| Methanol | 6.0 g |

A surface of the resultant polymer layer was subjected to rubbing treatment using a rubbing roller (outer diameter of 80 mm) in the conditions of rate of movement of the film of 100 m/min., the number of revolution of the rubbing roller of 1,000 rpm, and the tension for conveying the support film of 1 kgf/cm (width of film), whereby an orientation layer was formed.

"$|nx-ny|×d$" and "$\{(nx+ny)/2-nz\}×d$" of the triacetylcellulose film was determined, in which nx and ny is main refractive indices within the film, nz is a main refractive index in a thickness direction, and d is a thickness of the film (FIG. 1).

The thickness was measured with a micrometer, and Re values in various directions were measured by an ellipsometer (AEP-100, available from Shimadzu Seisakusho, Ltd.) to determine the above "$|nx-ny|×d$" and "$\{(nx+ny)/2-nz\}×d$". "$|nx-ny|×d$" was 6 nm and "$\{(nx+ny)/2-nz\}×d$" was 40 nm. Thus, the film had almost negative uniaxial property and the optic axis almost was coincident with the direction of the normal of the film.

In methyl ethyl ketone (22.0 g), 9.35 g of the discotic liquid crystal compound TP-30 (discotic compound previously mentioned) as a discotic compound having functional group, 4.30 g of the discotic liquid crystal compound TP-105 (discotic compound previously mentioned) as a discotic compound having nucleophilic group, and 1.00 g of the compound G-7 (compound previously mentioned) as a compound having nucleophilic group, were dissolved to prepare a coating liquid of the discotic compound. The coating liquid was coated on the orientation layer using a wire-bar coater (#3) to form a coated layer (discotic compound layer).

The coated film was fixed in a metal frame, and heated in a thermostat at a temperature of 110° C. for 3 minutes to orient the discotic liquid crystalline compound of the coated layer (formation of discotic nematic phase). Subsequently, the coated layer was heated at 120° C. for one hour and cooled to room temperature to form an optically anisotropic layer having a thickness of 1.8 μm. Thus, an optical compensatory sheet was obtained.

The optical compensatory sheet was observed by a polarizing microscope, and it was confirmed that the optically anisotropic layer showed a uniform optically anisotropic property in monodomain condition that orientation derived from discotic nematic phase was fixed. Further, the optically anisotropic layer was heated to a temperature of 200° C., but the layer showed no change of optically anisotropic property. Therefore the layer can be regarded as a layer having no liquid crystalline property.

EXAMPLE 2

Preparation of cured optically anisotropic layer

On a subbing layer of gelatin (0.1 μm) provided on polyethersulfone film (PES) (thickness: 100 μm; size: 100 mm ×100 mm, available from Sumitomo Bakelite Co., Ltd.), a coating solution of polyamic acid (SE-7210, available from Nissan Chemical Industries, Ltd.) was coated, burned at 180° C. to form a polyimide layer. Then the layer was subjected to rubbing treatment using a rubbing machine to form an orientation layer.

In methyl ethyl ketone, 1.87 g of the discotic liquid crystal compound TP-5 (discotic compound previously mentioned) as a discotic compound having functional group, 0.86 g of the discotic liquid crystal compound TP-105 (discotic compound previously mentioned) as a discotic compound having nucleophilic group, and 0.13 g of the compound G-1 (compound previously mentioned) as a compound having nucleophilic group, were dissolved to prepare a 10 weight % methyl ethyl ketone solution (coating liquid of the discotic compound).

The coating liquid was coated on the orientation layer at 1,000 rpm using a spin-coater to form a coated layer.

Subsequently, the coated layer was heated on a heated roll (a surface temperature of 130° C.) for 1 minute in such a manner that the polyethersulfone film side was in contact with a surface of the roll (formation of discotic nematic phase), and continuously heated on a heated roll (a surface temperature of 140° C.) for 15 minute in such a manner that the polyethersulfone film side was in contact with a surface of the roll, and then cooled to room temperature to form an optically anisotropic layer having a thickness of 1.8 μm. Thus, an optical compensatory sheet was obtained.

The optical compensatory sheet was observed by a polarizing microscope, and it was confirmed that the optically anisotropic layer showed a uniform optically anisotropic property in monodomain condition that orientation derived from discotic nematic phase was fixed. Further, the optically anisotropic layer was heated to a temperature of 200° C., but the layer showed no change of optically anisotropic property. Therefore the layer can be regarded as a layer having no liquid crystalline property.

[EVALUATION OF OPTICAL COMPENSATORY SHEET]

As for the optical compensatory sheets obtained in Examples 1 and 2, optical characteristics were evaluated below.

The angle (β) where the optic axis (or direction in which retardation value shows the minimum) and the normal line of the sheet intersect, and retardation (Δn·d) were determined. Re values at various incident angles were measured by an ellipsometer (AEP-100, available from Shimadzu Seisakusho, Ltd.) in transmission mode to determine incident angle dependence of Re. From data of the incident angle dependence of Re, the optimum refraction indices in the three directions ($n_1$, $n_2$ and $n_3$; see FIG. 2), the optimum retardation (Δn·d) and angle (β) of the optic axis were calculated.

The obtained results were set forth in Table 1.

TABLE 1

| Example | Optic angle (β; degree) | Δn · d (nm) |
|---|---|---|
| Example 1 | 32 | 128 |
| Example 2 | 38 | 120 |

EXAMPLE 3

Preparation of liquid crystal display

The optical compensatory sheet obtained in Example 1 was attached to TN-type liquid crystal cell that the product of the difference between an extraordinary ray and an ordinary ray of the liquid crystal and the clearance between the substrates of the liquid crystal cell was 480 nm, and the twisted angle of the liquid crystal was 90 degrees.

The obtained TN-LCD has a structure shown in FIG. 3.

[Evaluation of Liquid Crystal Display]

To the TN-LCD, a rectangular wave of 30 Hz was applied at a voltage of 0 to 5 V, and transmittances (T) were measured by varying viewing angle using a spectrophotometer (LCD-5000, available from Otsuka Electronics Co., Ltd.). From the measured data, the angle against the normal at which the contrast ($T_{0V}/T_{5V}$) on a black-and-white display showed 10 was defined as viewing angle and the viewing angles in a height (upper-lower) direction and a width (left-right) direction of the TN-LCD were determined.

Further, the TN-LCD having no optical compensatory sheet (Comparison Example 1) was evaluated in the same manner as above.

The obtained result is set forth in Table 2.

TABLE 2

| | Viewing Angle | |
|---|---|---|
| Example | upper–lower (degree) | left–right (degree) |
| Ex. 3 | 75–78 | 99–103 |
| Com. Ex. 1 | 23–27 | 33–36 |

What is claimed is:

1. An optical compensatory sheet which comprises a transparent support and an optically anisotropic layer provided thereon, wherein the optically anisotropic layer is a layer of polymer having discotic structure units formed by polymerization of a compound having at least two functional groups and a compound having at least two nucleophilic groups, at least one of the compounds being a discotic compound, or by polymerization of a discotic compound having at least one functional group and at least one nucleophilic group, the functional group being one selected from the group consisting of an isocyanato group, an isothiocyanato group, an oxiranyl group, an azyridinyl group, a thiiranyl group, an acid anhydride group and an activated ester group, and the nucleophilic group being at least one selected from the group consisting of an amino group, a hydroxyl group, a mercapto group, a carboxyl group, an oxide anion group, a sulfide anion group and a carboxylato anion group.

2. The optical compensatory sheet as defined in claim 1, wherein the transparent support has an orientation layer thereon.

3. The optical compensatory sheet as defined in claim 1, wherein the discotic compound has liquid crystalline property.

4. The optical compensatory sheet as defined in claim 1, wherein the polymerization is conducted by means of heating.

5. A process for the preparation of an optical compensatory sheet of claim 1 comprising the steps of:

applying a coating liquid containing a compound having at least two functional groups and a compound having at least two nucleophilic groups, at least one of the compounds being a discotic compound, or a coating liquid containing a compound having at least one functional group and at least one nucleophilic group, onto the transparent support to form a coated layer, the functional group being one selected from the group consisting of an isocyanato group, an isothiocyanato group, an oxiranyl group, an azyridinyl group, a thiiranyl group, an acid anhydride group and an activated ester group, and the nucleophilic group being at least one selected from the group consisting of an amino group, a hydroxyl group, a mercapto group, a carboxyl group, an oxide anion group, a sulfide anion group and a carboxylato anion group;

heating the coated layer of discotic liquid crystalline phase without irradiation of UV light to cause reaction between the functional group and the nucleophilic group contained in the layer, whereby a cured layer is formed; and cooling the cured layer to form an optically anisotropic layer.

6. A liquid crystal display comprising a liquid crystal cell which comprises a pair of substrates each of which is provided with a transparent electrode and twisted nematic liquid crystal sealed therebetween, a polarizing sheet arranged on each side of the liquid crystal cell, and the optical compensatory sheet of claim 1 provided between at least one side of the liquid crystal cell and the polarizing sheet.

7. A color liquid crystal display comprising a liquid crystal cell which comprises a pair of substrates provided with a transparent electrode, a transparent electrode of picture element and color filter, and twist-oriented nematic liquid crystal sealed between the substrates, a polarizing sheet arranged on each side of the liquid crystal cell, and the optical compensatory sheet of claim 1 provided between at least one side of the liquid crystal cell and the polarizing sheet.

8. A process for the preparation of an optical compensatory sheet of claim 1 comprising the steps of:

applying a coating liquid containing a compound having at least two functional groups and a compound having at least two nucleophilic groups, at least one of the compounds being a discotic compound, or a coating liquid containing a compound having at least one functional group and at least one nucleophilic group, onto the transparent support to form a coated layer, the functional group being one selected from the group consisting of an isocyanato group, an isothiocyanato group, an oxiranyl group, an azyridinyl group, a thiiranyl group, an acid anhydride group and an activated ester group, and the nucleophilic group being at least one selected from the group consisting of an amino group, a hydroxyl group, a mercapto group, a carboxyl group, an oxide anion group, a sulfide anion group and a carboxylato anion group;

heating the coated layer with no covering to form discotic liquid crystalline phase;

heating the layer of discotic liquid crystalline phase by means other than UV light to cause reaction between the functional group and the nucleophilic group contained in the layer, whereby a cured layer is formed; and cooling the cured layer to form an optically anisotropic layer.

* * * * *